US010692340B2

(12) United States Patent
Seelman

(10) Patent No.: US 10,692,340 B2
(45) Date of Patent: Jun. 23, 2020

(54) SMART BARRIER ALARM DEVICE

(71) Applicant: ECOLINK INTELLIGENT TECHNOLOGY, INC., Carlsbad, CA (US)

(72) Inventor: George Seelman, Temecula, CA (US)

(73) Assignee: Ecolink Intelligent Technology, Inc., Carlsbad, CA (US)

( * ) Notice: Subject to any disclaimer, the term of this patent is extended or adjusted under 35 U.S.C. 154(b) by 0 days.

(21) Appl. No.: 16/200,172

(22) Filed: Nov. 26, 2018

(65) Prior Publication Data

US 2019/0096202 A1 Mar. 28, 2019

Related U.S. Application Data

(60) Continuation-in-part of application No. 15/946,511, filed on Apr. 5, 2018, now Pat. No. 10,497,230, (Continued)

(51) Int. Cl.
*B60R 25/34* (2013.01)
*G08B 13/08* (2006.01)
(Continued)

(52) U.S. Cl.
CPC ......... *G08B 13/08* (2013.01); *G08B 13/1618* (2013.01); *G08B 21/0415* (2013.01); (Continued)

(58) Field of Classification Search
CPC ... G01S 5/02; G01S 11/06; G01S 5/00; G01S 5/0036; G01S 5/0226; G01S 5/0252; (Continued)

(56) References Cited

U.S. PATENT DOCUMENTS

| | | | |
|---|---|---|---|
| 4,639,902 | A | 1/1987 | Leverance et al. |
| 5,534,849 | A | 7/1996 | McDonald et al. |

(Continued)

FOREIGN PATENT DOCUMENTS

| | | | |
|---|---|---|---|
| JP | 10-239450 | A | 9/1998 |
| JP | 2004310495 | A | 11/2004 |
| WO | 2007111802 | A2 | 10/2007 |

OTHER PUBLICATIONS

United States Patent and Trademark Office, Non-Final Office Action issued in U.S. Appl. No. 15/946,511, Notification Date of May 13, 2019, 7 pgs.

(Continued)

*Primary Examiner* — Daniel Previl
(74) *Attorney, Agent, or Firm* — Greenberg Traurig, LLP

(57) ABSTRACT

A barrier alarm device for reducing the number of false alarms that may occur in a home or business security system. In one embodiment, a barrier alarm device, such as a door or window sensor, determines whether a barrier, such as a door or a window, has been opened, and determines whether a human being is inside a premises in proximity to the door or window. If a human being is inside the monitored premises when the door or window is opened, it indicates that the human being is authorized to be inside the monitored premises, and the barrier alarm device transmits a timed alarm signal to a central security panel, causing a security response to be generated by the central security panel if a predetermined time period elapses without a user canceling the security response.

18 Claims, 16 Drawing Sheets

Related U.S. Application Data which is a division of application No. 14/629,370, filed on Feb. 3, 2015, now Pat. No. 9,940,797.

(51) Int. Cl.

| | |
|---|---|
| ***G08B 25/00*** | (2006.01) |
| ***G08B 21/04*** | (2006.01) |
| ***G08B 13/16*** | (2006.01) |
| ***G08B 29/18*** | (2006.01) |
| ***G08B 25/14*** | (2006.01) |
| ***G08B 21/22*** | (2006.01) |

(52) U.S. Cl.

CPC ......... *G08B 21/0469* (2013.01); *G08B 21/22* (2013.01); *G08B 25/001* (2013.01); *G08B 25/008* (2013.01); *G08B 25/14* (2013.01); *G08B 29/188* (2013.01)

(58) Field of Classification Search

CPC ......... G01S 5/0273; G01S 5/06; G08B 21/24; G08B 25/016; G08B 25/12; G08B 29/181; G08B 21/0469; G08B 13/19621; G08B 21/0423; G08B 21/0484; G08B 25/08; G08B 21/043; G08B 21/0476; G08B 21/0492; G08B 21/22; G01C 21/206; H04B 1/38; H04B 17/309; H04B 1/385; H04L 27/362; H04L 25/0228; H04L 25/0242; H04L 25/4902; H04L 43/12; H04L 51/04; H04L 51/18; H04L 51/20; H04L 7/042; H04W 40/244; H04W 4/33; H04W 72/0413; H04W 4/021; H04W 4/06; H04W 4/14; H04W 4/80; H04W 4/90; H04W 52/0229; H04W 52/0254; H04W 56/001; H04W 84/18; A62C 3/14; E05B 65/1026; E05Y 2800/102; E05Y 2900/134; E06B 2003/343; E06B 2003/346; E06B 2003/406; E06B 2003/7057; E06B 2007/202; E06B 3/341; E06B 5/00; E06B 5/125; E06B 7/20; E06B 9/00; F21Y 2115/10; F21Y 2103/00; F24F 11/00; G06N 5/045; G06Q 50/22; G06Q 10/00; G06Q 10/06; G06Q 10/10; G06Q 50/165; G06Q 50/265; H04M 1/72538; H04M 2250/10; H04M 2250/52; H05B 33/0896; H05B 33/0845; H05B 33/0857; H05B 35/0866; H05B 33/0872; H05B 37/0218; H05B 37/0227; H05B 37/0245; H05B 37/0272; H05B 37/0281; A23L 27/70; A23L 27/88; A23L 7/191; A61B 5/00; A61B 5/002; A61B 5/4815; A61M 21/00; A61N 2005/0626; A61N 5/0618; B33Y 50/00; B60N 2/002; B60Q 9/00; B65D 1/32; B65D 25/42; B65D 51/2807; B65D 77/24; B65D 81/32; B65D 83/06; E05G 5/02; E05G 7/008; F21K 9/232; F21K 9/238; F21K 9/27; F21K 9/272; F21K 9/278; F21S 2/00; F21V 23/0442; F21V 23/06; G06F 17/00; G06F 17/50; G06F 2217/04; G06K 9/00221; G06K 9/00369; G16H 40/20; G16H 40/67; G16H 50/20; Y02B 20/383; Y02B 20/46; Y02D 70/00; Y02D 70/10; Y02D 70/142; Y02D 70/144; Y02D 70/164; Y02D 70/20; Y02D 70/26; Y04S 10/54

USPC ...... 340/545.9, 501, 541, 550, 545.1, 545.2, 340/547, 552, 555, 908.1, 545.8

See application file for complete search history.

(56) References Cited

U.S. PATENT DOCUMENTS

| | | | | |
|---|---|---|---|---|
| 5,656,900 | A | 8/1997 | Michel et al. | |
| 5,712,621 | A * | 1/1998 | Andersen | G08B 13/08 324/207.16 |
| 5,769,011 | A * | 6/1998 | Daniel | E05G 5/02 109/2 |
| 6,392,547 | B1 | 5/2002 | Stewart et al. | |
| 6,542,071 | B1 * | 4/2003 | Ohtsubo | B60R 25/2036 340/10.1 |
| 6,919,918 | B2 | 7/2005 | Carretero Guerrero | |
| 2001/0056579 | A1 | 12/2001 | Kogane et al. | |
| 2004/0021778 | A1 | 2/2004 | Oldani et al. | |
| 2006/0170572 | A1 | 8/2006 | Kurachi et al. | |
| 2007/0089467 | A1 | 4/2007 | Ace-Kirker | |
| 2007/0132578 | A1 | 6/2007 | Powell | |
| 2007/0182540 | A1 | 8/2007 | Marman | |
| 2008/0157964 | A1 * | 7/2008 | Eskildsen | G08B 29/188 340/545.1 |
| 2009/0309723 | A1 * | 12/2009 | Freebody | G08B 3/10 340/545.1 |
| 2010/0245088 | A1 * | 9/2010 | Meier | G08B 13/08 340/545.1 |
| 2013/0249730 | A1 | 9/2013 | Adcook | |
| 2013/0257611 | A1 * | 10/2013 | Lamb | G08B 13/02 340/501 |
| 2015/0097669 | A1 | 4/2015 | Li | |
| 2016/0093179 | A1 * | 3/2016 | Hanning | G08B 13/1618 340/541 |

OTHER PUBLICATIONS

ISA/US, Int. Search Report and Written Opinion issued on PCT/US16/17807, dated May 6, 2016, 13 pages.

JPO, Office Action issued on Japanese patent application No. 2017-544674, dated Dec. 25, 2019, 28 pages.

ISA/US, International Search Report and Written Opinion issued on PCT application No. US19/56176, dated Nov. 8, 2019, 9 pages.

* cited by examiner

SMART BARRIER ALARM DEVICE

CROSS-REFERENCE TO RELATED APPLICATION

The present application is a continuation-in-part of U.S. patent application Ser. No. 15/946,511, filed on Apr. 5, 2018, which is a divisional of U.S. patent application Ser. No. 14/629,370, filed on Feb. 3, 2015, now U.S. Pat. No. 9,940,797.

BACKGROUND

Field of Use

The present application relates to the field of home and business security. More specifically, the present application relates to a barrier alarm device that helps reduce the occurrences of false alarms.

Description of the Related Art

Security systems for homes and businesses have been around for many years. Often, these systems make use of barrier alarm devices, such as door and window sensors, motion detectors, sound detectors, etc. Door and window alarms typically comprise two distinct parts: a magnet and a reed switch/transmitter assembly. The reed switch/transmitter assembly is typically installed onto a stationary surface, such as a door or window frame, while the magnet is mounted to a movable portion of a door or window. When the door or window is closed, the magnet and reed switch are in close proximity to one another, maintaining the reed switch in a first state indicative of a “no alarm” condition. If the door or window is opened, proximity is lost between the magnet and the reed switch, resulting in the reed switch changing state, e.g., from closed to open or from open to closed. The change of state is indicative of a local alarm condition, and a signal may be generated by circuitry located within the reed switch assembly and sent, via wires or over-the-air, to a central security panel or gateway in the home, which may forward the signal to a remote monitoring station. In addition, a very loud audible alert is typically generated by a siren coupled to the central security panel in the home indicating that a door or window has been opened.

One problem with security systems is the relatively frequent occurrence of false alarms. Most security systems offer a “home” arming feature which arms all door and window sensors, but does not arm any interior motion sensors. In this way, occupants are protected against intruders while being able to move about within the home without causing motion sensors to alarm. Often times, occupants forget that the security system is armed, and when they open a door or a window, a false alarm is triggered. These false alarms sometimes cause a response by police or fire personnel, wasting valuable public resources. Additionally, homeowners may be fined if too many false alarms occur within a certain time period. Further, occupants are often startled if a local siren is triggered inside the home, because the siren is deliberately designed to be very loud.

It would be desirable to provide a security system that allows occupants to open doors or windows while the security system is in an armed, “home” mode of operation, without triggering an immediate, startling, audible alarm caused by a local siren.

SUMMARY

The embodiments described herein relate to methods, systems, and apparatus for monitoring a barrier by a barrier alarm device that reduces or prevents false alarms from occurring. In one embodiment, a barrier alarm device is describe, comprising a barrier status detection device for detecting when a barrier monitored by the barrier alarm device has been opened, a human detection device for determining when a human being is inside a premises in proximity to the barrier, a transmitter for transmitting a timed alarm signal to a receiver, the timed alarm signal for initiating a timer, a memory having processor-executable instructions stored thereon, and a processor coupled to the barrier status detection device, the human detection device, the transmitter, and the memory, for executing the processor-executable instructions that cause the barrier alarm device to determine, by the processor via the barrier status detection device, that the barrier has been opened, determine, by the processor via the human detection device, that a human being is inside the premises in proximity to the barrier, and transmit, by the processor via the transmitter, the timed alarm signal to the receiver when the barrier has been opened and when a human being is inside the premises in proximity to the barrier.

In another embodiment, a central security panel is describe, comprising a communication interface for receiving signals from a barrier alarm device, a memory for storing processor-executable instructions, and a processor coupled to the communication interface and the memory, for processing the processor-executable instructions that causes the central security panel to receive a first alarm signal from a barrier alarm device that monitors a barrier of a premises, the first alarm signal indicative of the barrier being opened and that a human being is inside the monitored premises and in proximity to the barrier, in response to receiving the first alarm signal, begin monitoring an elapsed time from when the first alarm signal was received, determine, by the processor, that the elapsed time has exceeded a predetermined time, in response to determining that the elapsed time has exceeded the predetermined time, generate a security response, and provide the security response to a receiver via the communication interface.

In another embodiment, a method is described, performed by a barrier status detection device, comprising determining when a barrier monitored by the barrier status detection device has been opened, determining when a human being is inside a premises monitored by a central security panel and inside the premises, and transmitting a timed alarm signal to a local receiver, the timed alarm signal for initiating a timer, when the barrier has been opened and a human being is in inside the premises and in proximity to the barrier.

In yet another embodiment, a method is performed by a central security panel, comprising receiving a first alarm signal from a barrier alarm device that monitors a barrier of a premises, the first alarm signal indicative of the barrier being opened and that a human being is inside the premises in proximity to the barrier, in response to receiving the first alarm signal, starting a countdown timer, determining that the countdown timer has expired, in response to determining that the countdown timer has expired, generate a security response, and providing the security response to a receiver via a communication interface.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein.

DETAILED DESCRIPTION

The present application relates to systems, methods and apparatus for monitoring doors and windows ("barriers") using barrier alarm devices, such as door or window sensors, while reducing occurrences of false alarms. For the purpose of the discussions herein, the term "barrier alarm device" means any device used to monitor and report states, physical conditions, attributes, status, or parameters of an entrance/exit barrier such as a door, a window, a garage door, a gate, etc. Examples of barrier alarm devices comprise door and window sensors, glass breakage detectors, light interruption detectors, etc.

Embodiments of a barrier alarm device described herein comprise a human detection device that detects the presence of a human being in proximity to the barrier alarm device, either inside or outside of monitored premises. In once embodiment, if a person inside a structure, such as a person's residence, opens a monitored door or window while a security system is armed, an alarm will not immediately be triggered if the barrier alarm device senses the person in inside the structure in proximity to the barrier that was opened. Instead, a timed alarm signal is generated by the barrier alarm device and transmitted to a security panel which, in response, start a countdown timer that allows a person to cancel a security response from occurring if a certain action is taken before the countdown timer expires. This new barrier alarm device operates on the principle that if a door or window is opened and a person is detected nearby the barrier alarm device on the inside of the premises, it is assumed that the person is authorized to be inside the premises, and a security response should not be immediately generated when the door or window is opened, allowing an authorized person time to cancel the security response. Conversely, a new barrier alarm device may operate on the principle that if a door or window is opened, and a person is detected in proximity to the barrier alarm device on the outside of the premises, a security response should be immediately initiated. Each of these principles is discussed in detail below.

Figure 1:
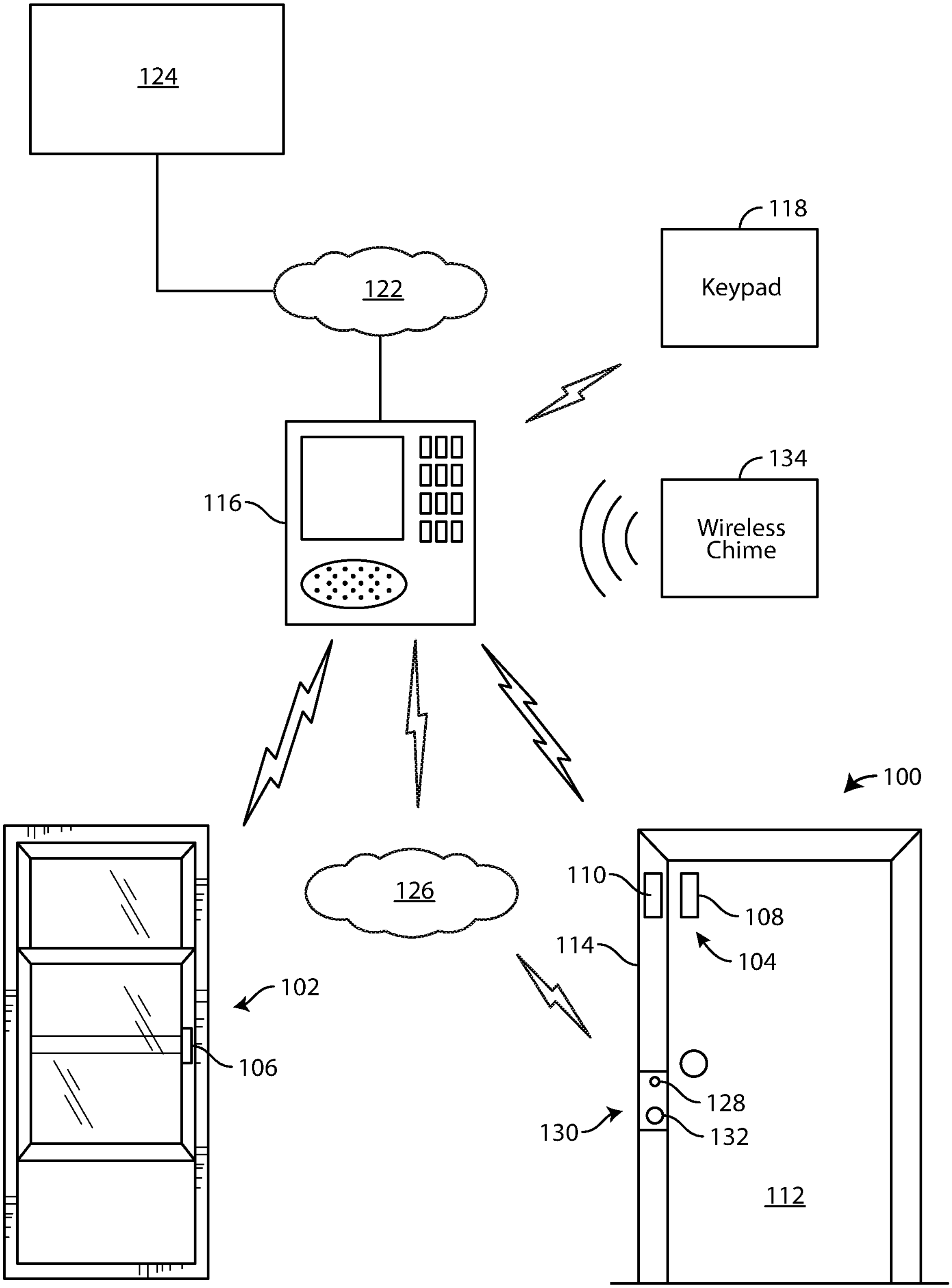
FIG. 1 is an illustration of a security system in accordance with one embodiment of the principles discussed herein.

FIG. 1 is an illustration of a security system in accordance with one embodiment of the principles discussed herein. In this embodiment a door assembly 100 and a window assembly 102 are monitored by barrier alarm devices 104 and 106, respectively. In one embodiment, barrier alarm device 104 comprises magnet 108 mounted to door 112 and reed switch assembly 110 mounted to door frame 114, while barrier alarm device 106 comprises a magnet-less type sensor. The barrier alarm devices could, use alternative techniques to magnetic field sensing to determine that status of a door or a window.

Each of the barrier alarm devices communicates with a receiver, such as central security panel 116, typically using wireless RF signals generated by the barrier alarm devices and/or central security panel 116. For example, if door 112 is opened, reed switch assembly 110 detects a reduction or elimination of a magnetic field produced by magnet 108 as magnet 108 moves away from reed switch assembly 110 as door 112 is opened. In response, reed switch assembly 110 transmits a message to central security panel 116 indicative of a local alarm condition, e.g., door 112 has been opened. In other embodiments, an Internet-connected "hub" or "gateway" may replace central security panel 116, where signals from barrier alarms and other security devices are sent to a central processing station, such as a server in the "cloud", for processing. References made to "central security panel 116" herein shall also include devices such as a hub, gateway, or the like. Additionally, the functionality of central security panel 116 may be implemented by a remote processing device, such as a server accessible by security panel 116 over a wide-area network, such as the Internet. In this embodiment, signals from barrier alarm devices and other sensors may be sent via central security panel 116 to such a remote processing device, and central security panel 116 may receive commands from the remote processing device, such as to cause a siren located inside and/or outside a premises monitored by one or more barrier alarm devices, to produce a very loud, audible siren, to cause one or more lights to turn on, to lock or unlock one or more wireless locks, etc.

Some barrier alarm devices are capable of being placed into an open position while remaining "armed". For example, some reed switch barrier alarm devices may use two magnets, a first magnet positioned near the bottom of a window and one placed several inches above the first magnet along a window frame such that the resultant opening allows air through the window but not a human being. Thus, in an open but monitored position, the window is opened so that the reed switch assembly is in close proximity to the second magnet. Then, if an unauthorized person tries to enter the premises by opening the window further, an immediate alarm signal will be generated.

In some embodiments, central security panel 116 may send messages to either of the barrier alarm devices requesting a status of either alarm, e.g., either "open" or "closed". In response, one or both barrier alarm devices may transmit a response to central security panel 116 indicating a status of the door or window, as the case may be. Other commands may be transmitted by central security panel 116 to other devices, such as "sound alarm" (to a wireless siren), "turn on lights" (to a lamp control module), open gate (to an electronic gate opener), lock doors (to a wireless lock), etc.

As described above, central security panel 116 monitors barrier alarm devices 104, 106, and other security devices (for example, a tilt sensor, shock sensor, motion detector, passive infra-red detector, light interruption detector, etc.) that may be part of the security system. Such security panels are widely used in home security systems, sold by large companies such as Honeywell Security of Melville, N.Y., 2Gig Technologies of Lehi, Utah. In addition, central security panel 116 generally provides status information to users via a display, generally providing a visual indication of the status ("open", "closed", "on", "off", "normal", "alarm", etc.) of each barrier alarm device, other security devices in the system, or the system as a whole. Central security panel 116 may also be in communication with an off-site remote monitoring station 124 via communication network 122, such as the Internet, PSTN, a fiber optic communication network, a wireless communication network (e.g., cellular, data, satellite, etc.), and/or other wide-area network(s). Remote monitoring station 124 typically provides security monitoring services for homes and businesses equipped with security systems such as the one shown in FIG. 1. Remote monitoring station 124 is adapted to receive communications from central security panel 116 via network 122 in response to central security panel 116 receiving an indication of an alarm condition being sensed by one or more barrier alarm devices/sensors in the security system. In other embodiments, central security panel 116 simply receives raw data from the barrier alarm devices and determines, based on the data, whether a local alarm condition has occurred. When a local alarm condition is detected, central security panel 116 generates a system alarm which may comprise taking one or more security responses, such as notifying remote monitoring station 124 that a local alarm condition has occurred, illuminating one or more lights, causing one or more audible alerts to sound within a home or business, etc.

Keypad 118 is a remote user interface, wired or wirelessly coupled to central security panel 114. Keypad 118 may be conveniently located near an entry door and used to arm and disarm the security system, and display status information to a user. It is also generally used to allow a user to cancel an alarm, preventing a security response from being initiated, such as in the case when a timed alarm signal is sent by a barrier alarm that monitors a primary entry door. The timed alarm signal allows an authorized user to open a monitored door, whereupon a countdown timer is generally started by central security panel 116, giving the person a fixed time period in which to cancel a security response by central security panel 116. To cancel the security response, an authorized person typically enters a known security code into keypad 118, and keypad 118 transmits the security code to central security panel 116, whereupon central security panel 116 cancels the security response if the security code matches an authorized security code stored in a memory of central security panel 116.

Figure 2:
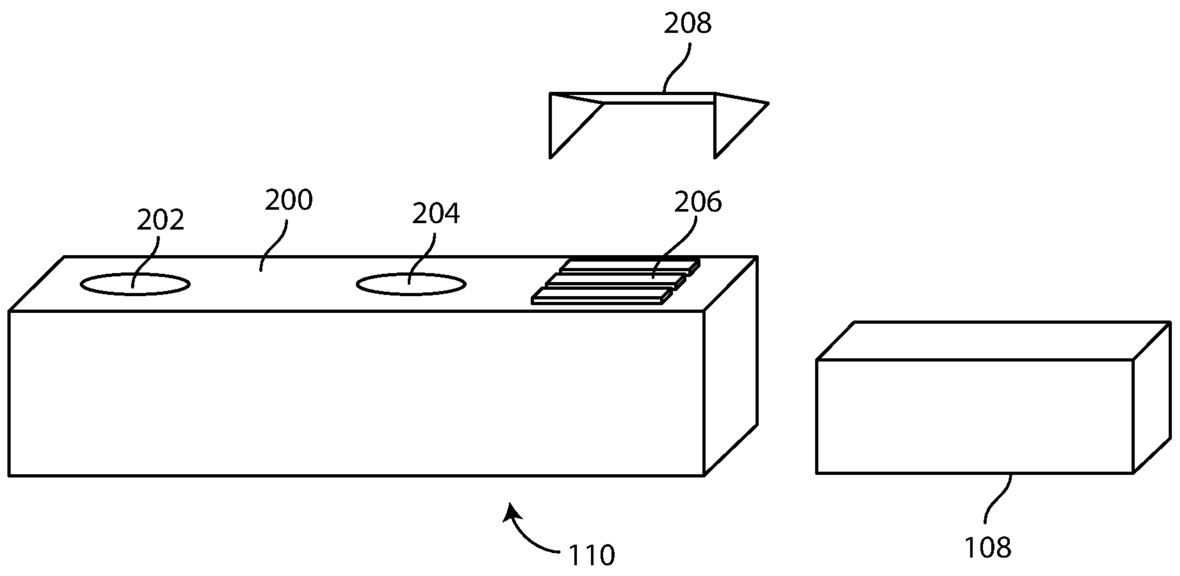
FIG. 2 is a perspective view of one embodiment of a barrier alarm device shown in FIG. 1.

FIG. 2 is a perspective view of one embodiment of a barrier alarm device, comprising magnet 108 and reed switch assembly 110. In other embodiments, the barrier alarm device may use alternative door/window status detection devices, such as an ultrasonic transducer/receiver, an infrared transmitter/receiver, or some other device to determine whether a window is open or closed. The barrier alarm device may have additional features, such as a user interface 202 and status indicator 204. The user interface 202 may comprise a pushbutton or other switch to provide input to the barrier alarm device. For example, in some embodiments, user interface 202 is used to place the barrier alarm device into a "learn" state of operation for initial installation and pairing with central security panel 116, or can be used to "bypass" a barrier alarm device, for temporarily disabling a barrier alarm device. Status indicator 204 can comprise, for example, an LED or a piezo speaker and related electronics to indicate a state of the barrier alarm (i.e., normal, learn, low battery) and/or providing an indication that a timed alarm signal has been transmitted. Such a timed alarm signal is transmitted by a barrier alarm device when the barrier alarm device determines that a door or window has been opened, and that a human being is inside a structure in proximity to a barrier being monitored by the barrier alarm device. In this situation, status indicator 204 may be illuminated, or emit one or more sounds, indicating to the person in proximity to the barrier that he or she must cancel a security response within a fixed time period, as monitored by a countdown timer located either in the barrier alarm device, the central security panel, or a cloud-based server, such as within 30 seconds. The illumination and/or sound is generally bright/loud enough to gain the person's attention, but not so as to startle the person. For example, one or more audible "chirps" may be emitted by a piezo speaker when the timed alarm signal is transmitted, each chirp less than 40 decibels or so in volume. In one embodiment, as the countdown timer nears its expiration, the indication(s) produced by status indicator 204 may increase in frequency, intensity, and/or volume.

In one embodiment, reed switch assembly 110 comprises housing 200 that covers a processor, a barrier state detection device (in this example, a reed switch), an RF transmitter, a human detection device, and a battery. For purposes of discussion herein, the term "barrier alarm device" is used interchangeably with the term "reed switch assembly" or the combination of reed switch assembly 110 and magnet 108. Of course, the barrier alarm device could comprise any number of alternative embodiments, such as a magnet-less door window sensor, an RF detector, an RFID sensor, a light interruption detector, or any other device that is able to determine the status of a barrier such as a door or a window (i.e., whether a door or window is open or closed). The reed switch is used to detect the presence or absence of a magnetic field produced by magnet 108 and the transmitter used to transmit information to central security panel 116 relating to the status of a door or window. Reed switch assembly 110 further comprises a human detection device for detecting the presence of a person inside a home or business and in proximity to the barrier being monitored by the barrier alarm device. The term "in proximity" generally means within a distance from a barrier for a human being to open or close the barrier.

As mentioned above, reed switch assembly 110 comprises a human detection device. The human detection device detects the presence of a human being in proximity to a barrier that is being monitored by the reed switch assembly. In one embodiment, the reed switch assembly is configured to detect human beings inside a monitored premises and in proximity to a barrier and in another, configured to detect human beings outside a monitored premises and in proximity to a barrier. When configured to detect human beings outside of a monitored premises, the reed switch assembly may use a detector that is external to housing 200 and coupled to the detector via a wire or via wireless communications. For example, an ultrasonic transducer and receiver could be mounted external to a window, and a wire connecting it to the reed switch assembly. In other embodiments, reed switch assembly 110 comprises hardware and related circuitry to detect a human being outside of a premises, such as by using radar, subsonic tones.

Reed switch assembly 110 may comprise one or more apertures 206 to allow a human detection device inside housing 200 to propagate signals in order to detect a human being in proximity to a barrier. For example, if the human detection device is an ultrasonic transducer and receiver, the apertures 206 allow ultrasonic pings to escape the housing and to be returned to the ultrasonic receiver for processing. In other embodiments, the apertures 206 may, additionally or alternatively, be located on a different surface of housing 200 in order to better direct signals used to determine the presence of a human being. For example, in the embodiment shown in FIG. 2, apertures 206 are located on "front-facing" side of housing 200. This configuration might be best for a barrier alarm device that is mounted between three and a half to six feet from the floor, for example, such as on a "head" of a movable portion of a double hung window, to project signals horizontally towards anyone who might be in proximity to the window. In an embodiment where the barrier alarm device is mounted between seven and ten feet, for example mounted to a top portion of a door, apertures 206 might be formed on the "bottom-facing" surface of housing 200, in order to project signals downwards, towards a human being who may be opening the door.

In some embodiments, a deflection device 208 may be used to better guide signals emanating from housing 200 to detect a human being after being installed over apertures 206. In one embodiment, deflection device 208 comprises a fixed structure that mounts over apertures 206. In another embodiment, deflection device 208 comprise movable "shutters" or "louvers" mounted over or through apertures 206 to allow a user to adjust the direction of signals emanating from housing 200. The deflection device 208 may be configured to guide signals at a certain angle away from the housing 200 to have the best opportunity to sense a human being, e.g., to guide signals to where a human being would expect to be when the reed switch assembly is mounted in a typical location, such as on top of a door or window frame. For example, the angle of deflection device 208 may be 45 degrees, thereby guiding signals downwards and away from the barrier by 1-2 feet or so, depending on how high the reed switch assembly is mounted.

In one embodiment, when a person is detected near barrier alarm device 110 inside a monitored premises, no alarm signal is transmitted to security panel 116 if a door or window is opened or, conversely, if a person is not detected when a door or window is opened, an alarm signal is transmitted to security panel 116. This reduces the occurrence of false alarms, because a person opening a door or window from within a monitored premise is assumed to have authorization to be there. In another embodiment, the human detection device is configured to detect the presence of a person near the barrier alarm device, but outside the monitored premises. An alarm signal will only be generated when a door or window is opened and a person is detected near the barrier alarm device, outside the monitored premises or, conversely, when a door or window is opened and no person is detected outside the door or window, no alarm signal is transmitted to central security panel 116. In another embodiment, a bypass signal is sent to central security panel 116 when it is determined that an authorized person has opened a door or a window, the bypass signal is an instruction to central the remote location 116 to ignore future alarm signals generated by the barrier alarm device or to disarm the system.

Figure 3:
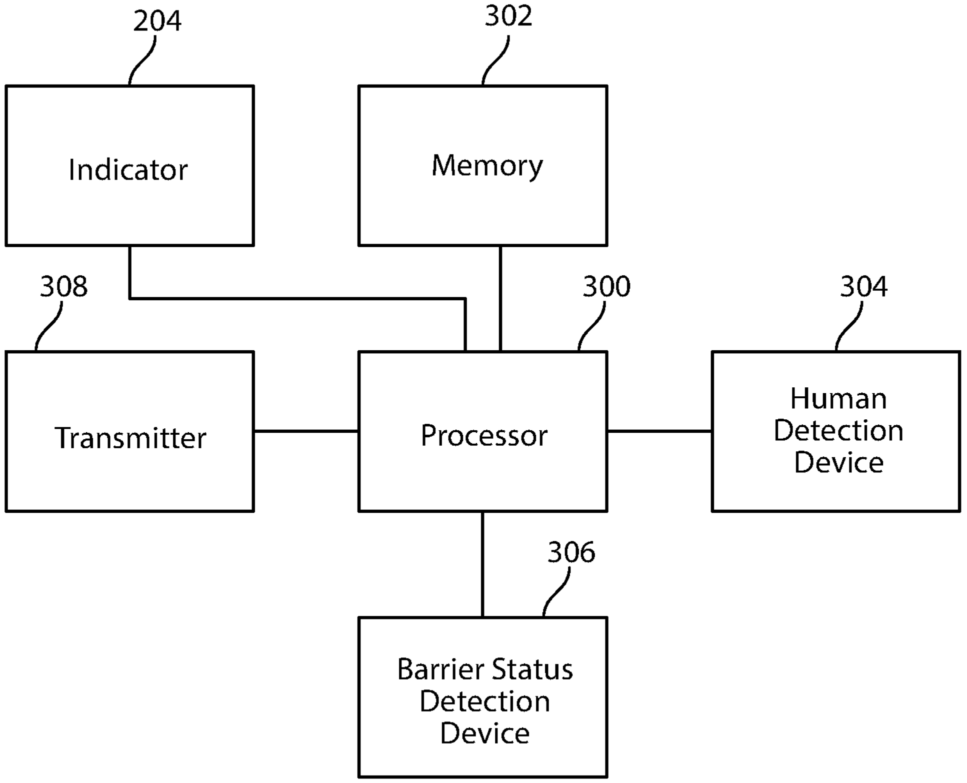
FIG. 3 is a functional block diagram of one embodiment of the barrier alarm device shown in FIG. 2.

FIG. 3 is a functional block diagram of one embodiment of a portion of barrier alarm device 104 or 106 in accordance with the teachings herein. Specifically, FIG. 3 shows processor 300, memory 302, human detection device 304, a barrier status detection device 306, and transmitter 308. It should be understood that the functional blocks may be coupled to one another in a variety of ways, and that not all functional blocks necessary for operation of the barrier alarm device are shown (such as a power supply), for purposes of clarity.

Processor 300 is configured to provide general operation of the barrier alarm device by executing processor-executable instructions stored in memory 302, for example, executable code. Processor 300 typically comprises a general purpose processor, such as an ADuC7024 analog microcontroller manufactured by Analog Devices, Inc. of Norwood Mass., although any one of a variety of microprocessors, microcomputers, and/or microcontrollers may be used alternatively. Due to the relative small size of barrier alarm devices, and the fact that most barrier alarm devices are battery-powered, processor 300 is typically selected to have low power consumption, small in size, and inexpensive to purchase.

Memory 302 comprises one or more information storage devices, such as RAM memory, ROM memory, EEPROM memory, UVPROM memory, flash memory, SD memory, XD memory, or other type of electronic, optical, or mechanical memory device. Memory 302 is used to store processor-executable instructions for operation of the barrier alarm device as well as any information used by processor 300, such as threshold information, parameter information, identification information, current or previous door or window status information, etc.

Barrier status detection device 306 is coupled to processor 300 and monitors or determines a state, physical condition, attribute, status, or parameter of something, such as the status (e.g., "open", "closed", "movement detected", etc.) of a door, window, gate, or other entrance or exit barrier. Barrier status detection device 306 may comprise a reed switch, ultrasonic transducer/receiver, an infrared transmitter/receiver, an RFID receiver, a tilt sensor, an accelerometer, a gyroscope, a motion sensor, or some other device to determine whether a window is open or closed.

Human detection device 304 comprises a device or circuitry to detect the presence of a person in proximity to the barrier alarm device, either inside a monitored premises, outside a monitored premises, or both. Examples of human detection device 304 include an ultrasonic transducer/receiver, an infrared transmitter/receiver, a capacitance sensor, an RF tank circuit, an RFID receiver and RFID chip, a motion detector, or some other circuitry or device able to detect the presence of a human being proximate to the barrier alarm device, door, or window. The term "proximate to the barrier alarm device, door or window" means that a person is within a distance from a barrier alarm device, door, or window that the person could open the door or window where a barrier alarm device is installed.

In one embodiment, when a person approaches a door or window monitored by the barrier alarm device, either inside premises being monitored or outside, human detection device 304 sends a signal to processor 300 when the person is within a predetermined distance from the barrier alarm device and, thus, the monitored door or window. In another embodiment, human detection device 304 is inactive until barrier status detection device 306 determines that a monitored door or window has been opened. In this embodiment, barrier status detection device 306 sends a signal to processor 300, and processor 300 then activates the human detection device 304 to determine if a person is proximate to the barrier alarm device and, thus, the monitored door or window, either inside the monitored premises, outside, or both.

Transmitter 308 comprises circuitry necessary to wirelessly transmit alarm signals and/or status messages and/or other information from the barrier alarm device to one or more receivers, such as central security panel 116 or a gateway device coupled to a wide area network such as the Internet, either directly or through in intermediate device, such as a repeater, commonly used in popular mesh networks. Such circuitry is well known in the art and may comprise BlueTooth, Wi-Fi, RF, optical, ultrasonic circuitry, among others. Alternatively, or in addition, transmitter 308 comprises well-known circuitry to provide signals to central security panel 116 or a gateway via wiring, such as telephone wiring, twisted pair, two-conductor pair, CAT wiring, AC home wiring, or other type of wiring.

In normal operation, processor 300 executes processor-executable instructions stored in memory 302 that causes processor 300 to monitor signals provided by barrier status detection device 306 indicative of changes in one or more states, physical conditions, attributes, status, or parameters of something being monitored, such as the condition of a door or window being "open" or "closed", changes between these states, or simply "movement". Processor 300 uses this data from barrier status detection device 306 to determine whether a predetermined condition has occurred relating to the barrier alarm device (herein "local alarm condition"), such as a door or window being monitored by the barrier alarm device changing state from "closed" to "open", movement between these states, or simply "movement". Human detection device 304 monitors for the presence of a person proximate to the barrier alarm device, door or window and provides signals to processor 300 indicative of whether a human being is proximate or not. If processor 300 determines that a door or window has been opened, it checks to see whether human detection device 304 has sensed a person proximate to the barrier alarm device, door, or window. In an embodiment where human detection device 304 is configured to detect persons inside a monitored premises, processor 300 generates an alarm signal only if there is no person proximate to the barrier alarm device, door, or window inside the monitored premises, indicating that door or window movement was the result of someone outside the monitored premises attempting unauthorized entry to the premises. In an embodiment where human detection device 304 is configured to detect persons outside a monitored premises, processor 300 generates an alarm signal only if there is a person proximate to the barrier alarm device, door, or window outside the monitored premises, again indicating that door or window movement was the result of someone outside the monitored premises attempting unauthorized entry to the premises. In any case, if processor 300 determines that a local alarm condition has occurred, an alarm signal is provided to transmitter 308 for transmission to a remote location, such as central security panel 116 or a gateway. In one embodiment, the alarm signal comprises a notification to central security panel 116 that a local alarm condition has been detected at a particular door or window being monitored by the barrier alarm device.

Thus, using the barrier alarm device described above, when a person inside a monitored premises opens a door or window while a security system is armed, an alarm signal will not be generated, or it will be ignored by central security panel 116, thereby avoiding a false alarm.

Figure 4:
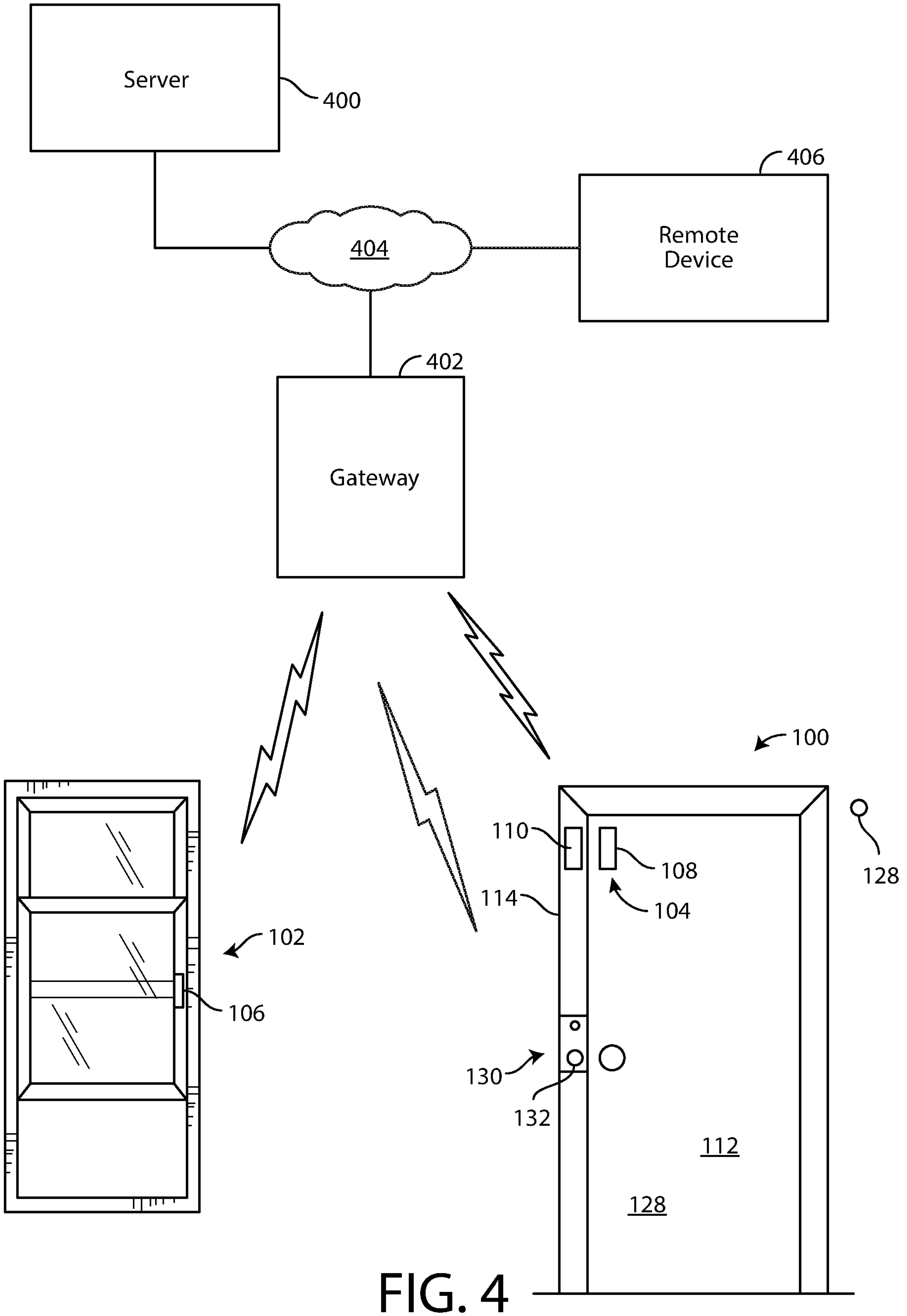
FIG. 4 is an illustration of another security system in accordance with another embodiment of the principles discussed herein.

FIG. 4 is an illustration of another security system in accordance with another embodiment of the principles discussed herein. In this embodiment, barrier alarm devices 104 and 106 communicate with a receiver such as gateway 402, which forwards communications from the barrier alarm devices to remote server 400 via wide area network 404. In one embodiment, the barrier alarm devices additionally may communicate with a second receiver, such as central alarm panel 116, as discussed previously. Gateway 402 comprises a wireless and/or wired router and/or modem commonly found in millions of homes and businesses for routing Internet traffic. In this embodiment, gateway 402 provides signals from the barrier alarm devices to remote server 400 and, in some embodiments, from remote server 400 to barrier alarm device 106. Remote server 400 comprises an electronic computing device such as a desktop or laptop computer, server, smartphone, wearable device, etc. In one embodiment, remote server 400 may communicate with one or more remote entities, such as other desktop or laptop computers, tablets, smart devices such as smartphones, wearable devices, etc., to notify interested parties of activities occurring on/in the premises being monitored by one or more barrier alarm devices. Such interested parties may include family members and friends of an owner or renter of the premises, police, fire, paramedics, a remote security monitoring center, etc.

In one embodiment, when a barrier alarm device detects that a barrier, such as a door or a window, has been opened, and further that a human being is inside the premises being monitored in proximity to the barrier, the barrier alarm device does not send an alarm signal to gateway 402, as this situation indicates that an authorized person inside the monitored premises has opened the barrier. In another embodiment, a bypass signal is transmitted to central security panel 116, as described above. Additionally, or alternatively, the barrier alarm device sends a status signal to gateway 402 to notify server 400 that a barrier has been opened. Server 400 may simply store an indication of the opening and the time that it occurred in an account associated with an account owner, i.e., the owner or renter of the monitored premises. Alternatively, or in addition, server 400 may transmit an alert to one or more remote devices 406, alerting interested parties of the opening.

When the barrier alarm device detects that a barrier has been opened, and further that a human being is not inside the premises being monitored in proximity to the barrier, the barrier alarm device sends an alarm signal to gateway 402, as this situation indicates that an unauthorized person outside the monitored premises has opened the barrier. Server 400 receives the alarm signal and typically stores the date and time of the alarm signal occurrence in an account, as described above. Alternatively, or in addition, server 400 sends a remote alarm signal to one or more remote devices 406, alerting users of those devices that a barrier has been opened by an unauthorized person. The alarm signal may also be transmitted from the barrier alarm device to central security panel 116.

In an alternative embodiment, a barrier alarm device may be configured to detect whether a human being is outside of the monitored premises in proximity to a barrier being monitored. Thus, when a barrier alarm device detects that a barrier has been opened and that a human being is outside the monitored premises in proximity to the barrier, an alarm signal is transmitted. Conversely, when a barrier alarm device 106 detects that a barrier has been opened, and that a human being is not outside the monitored premises in proximity to the barrier, an alarm signal is not transmitted (and/or a bypass signal is transmitted), as this condition indicates that an authorized person has opened the barrier. The bypass signal, or another, separate signal, may be transmitted to gateway 402, which then provides it to remote server 400 as an indication that a barrier has been opened by an authorized person.

In another embodiment, barrier alarm device 106 does not make determinations as to when to transmit an alarm signal and/or a bypass signal. Instead, processor 300 monitors barrier status determination device 306 and human detection device 304 and transmits a barrier status signal and a human status signal, respectively, to gateway 402, central security panel 116, or both, when a change in state of one or both devices occurs. Remote server 400 and/or central security panel 116 receives these status signals and determines whether a local alarm condition exists and whether to transmit an alarm signal to one or more remote devices 406 of interested parties and/or to a remote monitoring station 124. For example, as an authorized person approaches a barrier, human detection device 304 changes state and processor 300 causes transmitter 308 to transmit a human status signal to gateway 402, central security panel 116, or both, which forwards it on to remote server 400 via wide area network 404 in the case of gateway 402. If the authorized person does not open the barrier, and then walks away, barrier alarm device 106 transmits a second human status signal to gateway 402, central security panel 116, or both, indicative of the person leaving proximity to the barrier. If, however, the authorized person instead opens the barrier, barrier alarm device 106 transmits a barrier status signal to gateway 402, central security panel 116, or both, indicative of the barrier being opened. If remote server 400 and/or central security panel 116 receives this status indication signal, and the last known state of human detection device 304 is "person detected inside in proximity to barrier", then remote server 400 and/or central security panel 116 does not generate an alarm signal (but may provide a notification to interested parties of the status of the barrier such as "barrier open/authorized person present"). If no authorized person was present when the human status signal was received indicating that the barrier had been opened, remote server 400 and/or central security panel 116 generates an alarm signal that may provided to one or more interested parties and/or to remote monitoring station 124.

Figure 5A:
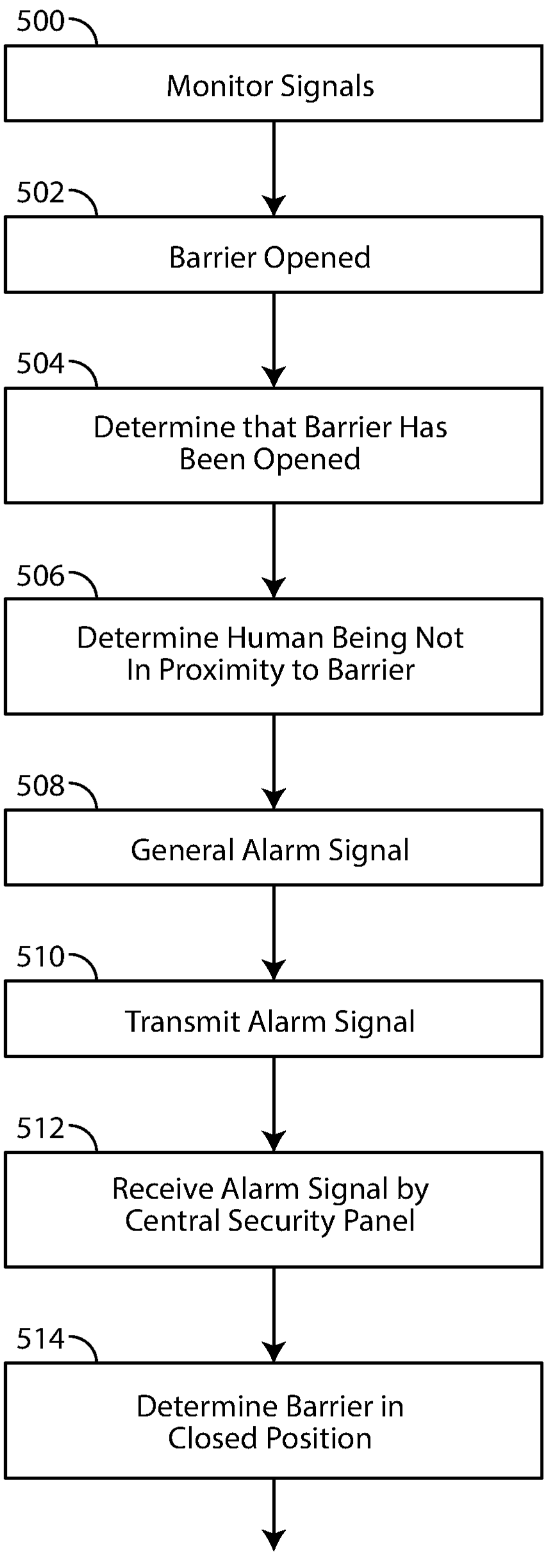
FIG. 5 is a flow diagram illustrating one embodiment of a method performed by the barrier alarm device shown in FIG. 2 when installed into a system such as FIG. 1.
Figure 5B:
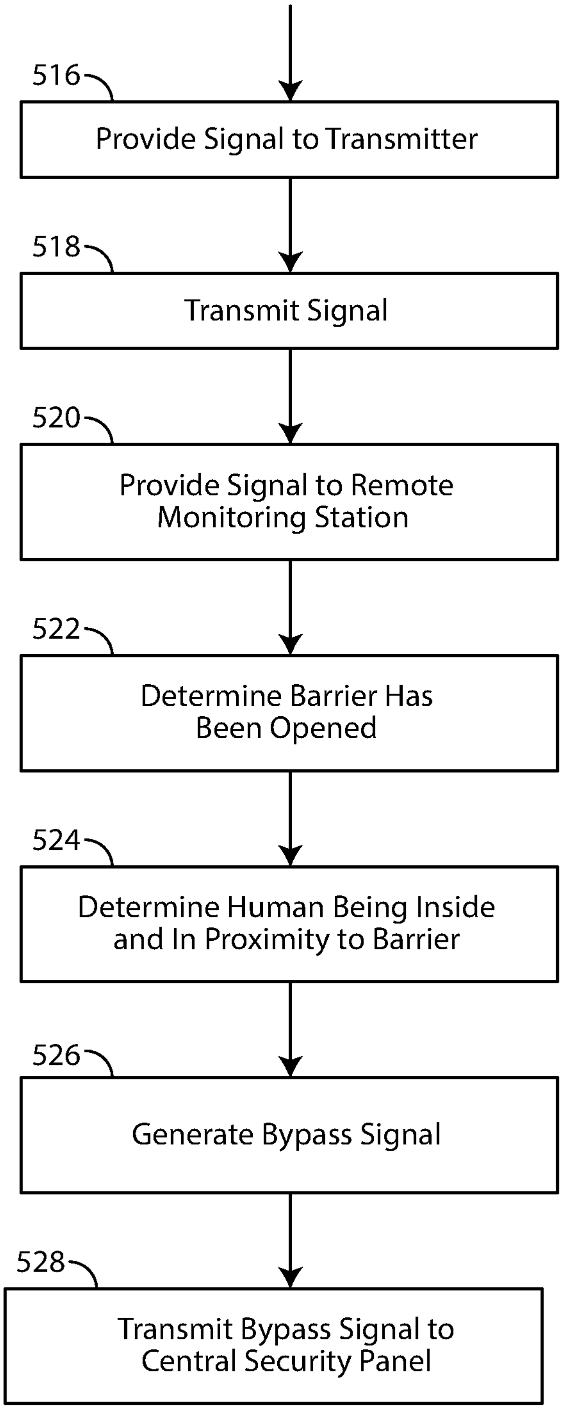

FIG. 5 is a flow diagram illustrating one embodiment of a method performed by a barrier alarm device installed proximate to a door or a window in a premises being monitored, for reducing or preventing the occurrence of false alarms. It should be understood that in some embodiments, not all of the steps shown in FIG. 5 are performed. It should also be understood that the order in which the steps are carried out may be different in other embodiments.

At block 500, processor 300 monitors signals from barrier status detection device 306 and human detection device 304.

At block 502, the barrier (e.g., door or window) is opened by an individual outside the premises.

At block 504, processor 300 determines that the barrier has been opened by detecting a change in a signal from barrier status detection device 306.

At block 506, processor 300 determines that a human being is not inside the premises in proximity to the barrier by evaluating the signals from human detection device 304.

In one embodiment, human detection device 304 periodically evaluates the space inside the premises and in proximity to the barrier to determine whether a human being is present or not. For example, a motion sensor may be energized once every three seconds to determine whether any infrared signal are detected, indicating the presence of a human being. In another embodiment, an ultrasonic transducer may transmit an ultrasonic "ping" once every two seconds to determine whether a return signal is received, indicating the presence of a human being.

In another embodiment, human detection device 304 is kept in a default, "quiescent", de-energized state and energized only when processor 300 determines that the barrier has been opened. The quiescent state refers to a low-power consumption state of operation or a no-power consumption state of operation, e.g., being in an "off" condition. In this way, power savings are achieved by the barrier alert device, as the circuitry comprising human detection device 304 is only energized when the barrier is opened. For example, in an embodiment where human detection device 304 comprises an ultrasonic transducer and an ultrasonic receiver, the ultrasonic transducer and ultrasonic receiver may be powered off until processor 300 determines that the barrier has been opened. In response to determining that the barrier has been opened, processor 300 energizes the ultrasonic transducer and an ultrasonic receiver circuitry and causes the ultrasonic transducer to emit a number of ultrasonic "pings" in order to determine whether a human being is in proximity to the barrier or not. In one embodiment, only a single ping is sent. Processor 300 then determines whether a human being is in proximity of the barrier by determining if a return signal was received by the ultrasonic receiver. If no human being was determined to be in proximity of the barrier, it indicates that the barrier was opened by someone outside the premises, e.g., an unauthorized person. In this case processing continues to block 508. If processor 300 determined that a human being was in proximity of the barrier, then no alarm signal would be transmitted to central security panel, as this is an indication that someone inside the premises opened the barrier, e.g., an authorized person, or a bypass signal is transmitted to central security panel 116.

At block 508, in response to determining that the barrier has been opened and that a human being is not inside the premises in proximity to the barrier, processor 300 generates an alarm signal and provides it to transmitter 308.

At block 510, transmitter 308 transmits the alarm signal to receiver, such as central security panel 116. Alternatively, or in addition, transmitter 308 transmits the alarm signal to gateway 402 connected to a wide area network, such as the Internet, for presentation to remote server 400.

At block 512, central security panel 116 receives the alarm signal from the barrier alarm device and takes at least one action. For example, central security panel 116 may cause a loud siren inside the premises to activate and/or send a remote alarm signal to a remote monitoring station so that the remote monitoring station may summon appropriate authorities to the premises. Remote server 400 may also provide a notification to interested parties that an alarm signal was received.

At block 514, processor 300 determines that the barrier has been placed into a closed position based on signals received from barrier status detection device 306.

At block 516, in response to determining that the barrier has been placed into the closed position, processor 300 provides a signal to transmitter 308 indicating that the barrier is in the closed position.

At block 518, transmitter 308 transmits the signal to either central security panel 116, gateway 402, or both.

At block 520, in response to receiving the signal by central security panel 116 from the barrier alarm device that the barrier is in the closed position, providing a remote alarm signal to a remote monitoring station by central security panel 116 when a future alarm signal is received by central security panel 116 from the barrier alarm device. In other words, the central security panel 116 will no longer ignore alarm signals sent by the barrier alarm device unless another bypass signal is received. Likewise, remote server 400 likewise will no longer ignore alarm signals sent by the barrier alarm device.

At block 522, after the barrier has been closed, processor 300 determines that the barrier has been opened by detecting a change in a signal from barrier status detection device 306.

At block 524, processor 300 determines that a human being is inside the premises in proximity to the barrier by evaluating the signals from human detection device 304.

At block 526, in response to determining that the barrier has been opened and that a human being is inside the premises in proximity to the barrier detection device, processor 300 may refrain from sending an alarm signal to central security panel 116 and gateway 402. Additionally, or alternatively, processor 300 generates a bypass signal and provides the bypass signal to transmitter 308 where it is transmitted to central security device 116 and/or gateway 402. The bypass signal is an instruction to central security panel 116 to ignore future alarm signals generated by the barrier alarm device. The bypass signal may, additionally or alternatively, cause central security panel 116 to disarm the entire security system and to notify one or more persons that the security system has been disarmed, and/or that a barrier has been opened by an authorized person. Similarly, the bypass signal, or a different signal, may be transmitted to gateway 402 to provide an indication to remote server 400 that a barrier has been opened by an authorized person and to ignore future alarm signals generated by the barrier alarm device until the barrier is again placed into the closed position.

At block 528, the bypass signal is transmitted by transmitter 308 to central security panel 116 and/or the same or similar signal is transmitted to gateway 402.

Figure 6:
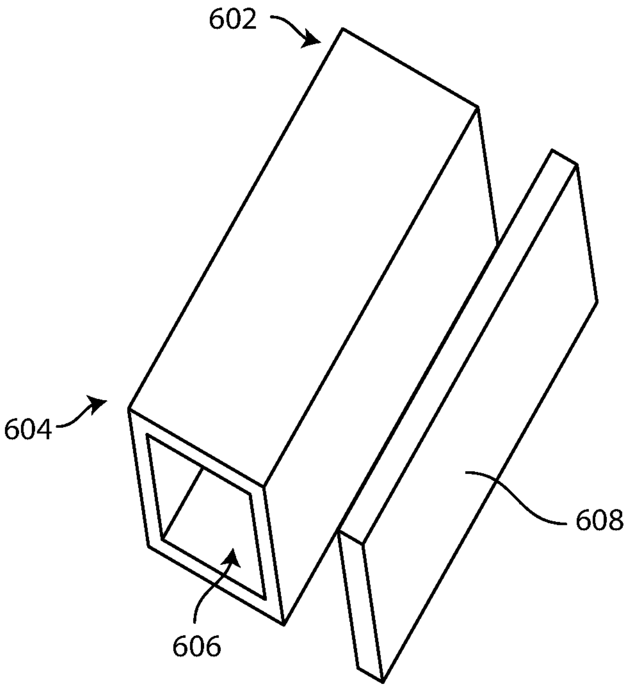
FIG. 6 is a perspective view of another embodiment of the smart barrier alarm device as shown in FIG. 2.

FIG. 6 is a perspective view of another embodiment of the smart barrier alarm device 104 or 106, shown as smart barrier alarm device 600. In this embodiment, smart barrier alarm device 600 comprises a top end 602 and a bottom end 604, with bottom end 604 comprising an opening 606. Smart barrier alarm device 600 is mounted to a door or window frame, or to a door or window itself, while magnet 608 is mounted in proximity to smart barrier alarm device 600 when a door or window is closed. In one embodiment, smart barrier alarm device 600 is mounted such that top end 602 is positioned upwards towards a ceiling, while bottom end 604 is positioned downwards and in alignment towards a door handle or door deadbolt, or window latch (or some other portion of a window), i.e., the bottom end 604 is pointed in a particular direction to determine whether a human being is present within a confined area, such as a door handle, door deadbolt, window latch, or some other portion of a window. In other embodiments, smart barrier alarm device 600 may be positioned horizontally, for example in the case where smart barrier alarm device 600 is mounted to a window sash. In this case, smart barrier alarm device 600 is mounted to a window sash such that bottom end 604 points towards a window latch, or some other portion of a window.

Figure 7:
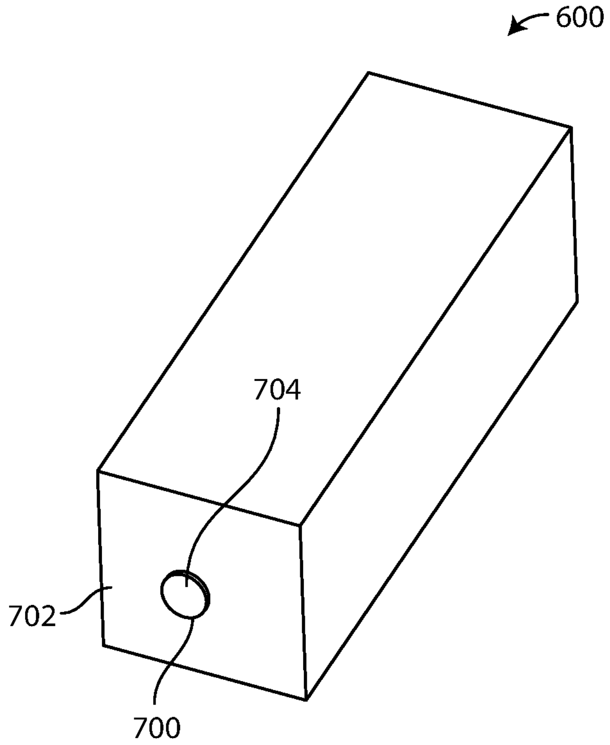
FIG. 7 is a perspective view of the smart barrier alarm device as shown in FIG. 6 showing an opening as a circular aperture formed through an end cap of the smart barrier alarm device.

It should be understood that opening 606 may resemble a perimeter of the external surface of smart barrier alarm device 600, in this case, a square, but that in other embodiments, opening 606 may comprise an aperture of any shape, formed into an end cap, as shown in FIG. 7, showing opening 606 as a circular aperture formed through end cap 702. Opening 606 is formed to allow human detection device 304 located inside smart barrier alarm device 600 to pass signals to detect the presence of a human hand that may grab a door handle, door deadbolt, or window latch (or some other portion of a window) upon opening a door or window. Detection of a human hand on or approaching a door handle, door deadbolt, or a window latch or some other portion of a window, such as a window "lip" formed, for example, on a window sill of a double-hung window that aids in opening a window. In one embodiment, a lens 704 may be used to direct light or sound energy towards a particular area of a door or window, for example, directed towards a door handle or deadbolt, or a portion of a window, such as a window latch or sash.

Figure 8:
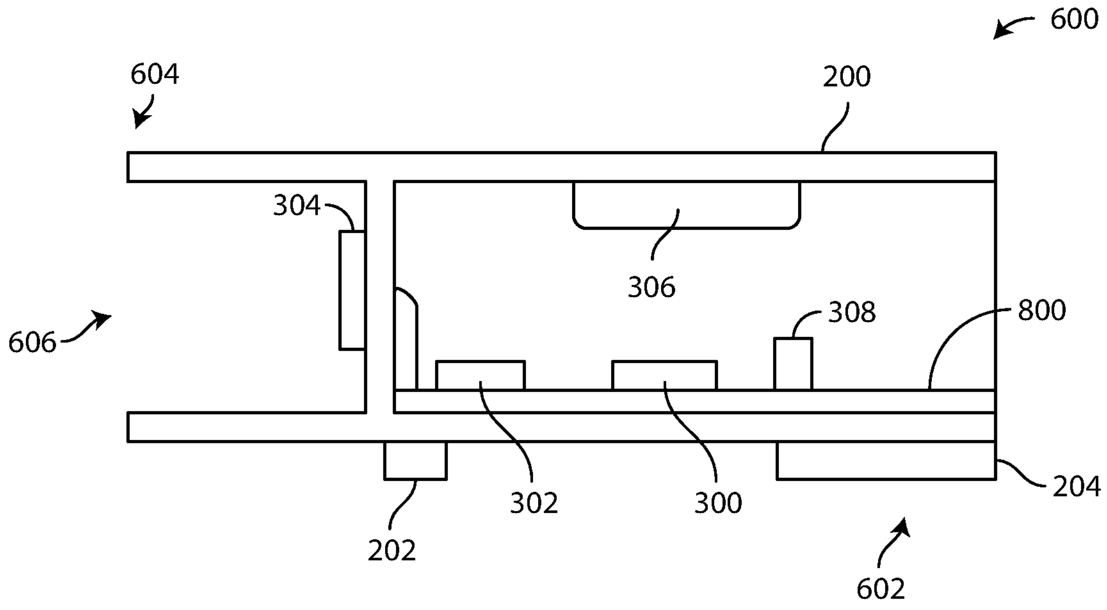
FIG. 8 is a cutaway, side view of the smart barrier alarm device as shown in FIG. 6.

FIG. 8 is a cutaway, side view of smart barrier alarm device 600. Shown is human detection device 304, processor 300, and memory 302 mounted to circuit board 800, housing 200, user interface 202, barrier status detection device 306, transmitter 308 and indictor 204. It should be understood that in other embodiments, user interface 202 and indicator 204 could comprise a single unit, such as a push button switch having one or more LEDs mounted thereon, and that the physical arrangement of the components shown in FIG. 8 could be arranged differently in other embodiments. Processor 300, memory 302, human detection device 304, barrier status detection device 306, transmitter 308, indictor 204 and user interface 202 are referenced in terms of the components found in FIGS. 2 and 3, as they are the same or similar in structure and in functionality.

In the embodiment shown in FIG. 8, human detection device 304 comprises a thermopile, an ultrasonic transceiver, an IR transceiver, a passive infrared detector, a camera, or any other circuitry capable of determining whether a human being is proximate to a barrier monitored by barrier alarm device 600. Generally, human detection device 304 is positioned so that any emissions from human detection device 304 is directed out of barrier alarm device 600 via opening 606. User interface 202 allows a person to operate barrier alarm device 600, for example, to place barrier alarm device 600 into various operating modes, or to turn barrier alarm device 600 on or off. Indicator 204 provides an indication that a timed alarm signal has been transmitted, as explained below.

Figure 9:
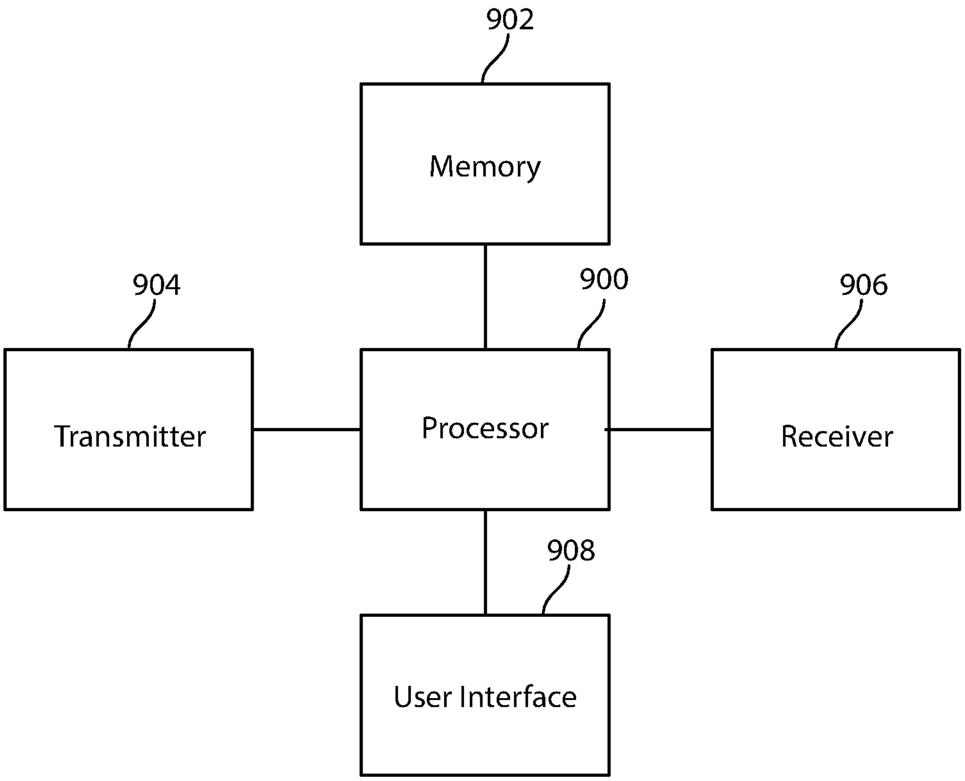
FIG. 9 is a functional block diagram of one embodiment of a central security panel using in conjunction with the smart barrier alarm device as shown in FIG. 6.

FIG. 9 is a functional block diagram of one embodiment of central security panel 116. Shown is processor 900, memory 902, transmitter 904, receiver 906 and user interface 908. It should be understood that the functional blocks may be coupled to one another in a variety of ways, and that not all functional blocks necessary for operation of the barrier alarm device are shown (such as a power supply), for purposes of clarity.

Processor 900 is configured to provide general operation of the central security panel 116 by executing processor-executable instructions stored in memory 902, for example, executable code. Processor 900 typically comprises a general purpose processor, such as an ADuC7024 analog microcontroller manufactured by Analog Devices, Inc. of Norwood Mass., although any one of a variety of microprocessors, microcomputers, and/or microcontrollers may be used alternatively. Processor 900 is typically selected based on factors such as cost, computational power, and memory requirements.

Memory 902 comprises one or more information storage devices, such as RAM memory, ROM memory, EEPROM memory, flash memory, SD memory, XD memory, or other type of electronic, optical, or mechanical memory device. Memory 902 is used to store processor-executable instructions for operation of central security panel 116 as well as any information used by processor 900, such as one or more authorized security codes, a predetermined countdown time (such as thirty seconds), an identification of all of the sensors that have been learned into central security panel 116 and information related thereto, door and window current status, etc.

Transmitter 904 comprises circuitry necessary to transmit alarm signals and/or status messages and/or other information from central security panel 116 to a remote receiver, such as central security panel 116. Transmitter 904 may also be used to transmit security responses, such as a signal to sound a local siren or to cause a strobe to flash. Such circuitry is well known in the art and may comprise POTS, Wi-Fi, RF, cellular, LTE, and/or Ethernet circuitry, among others.

Receiver 906 comprises circuitry necessary to receive timed alarm signals and alarm signals from one or more barrier alarm devices located throughout the premises. Such circuitry is well known in the art and may comprise Wi-Fi, RF, Ethernet or some other well-known, local-area network circuitry.

User interface 908 comprises one or more pushbuttons, touch screens, video cameras, microphones, display screens, or other well-known devices for allowing a user to interact with central security panel 116 for purposes of introducing new sensors, or barrier alarm devices, to central security panel 116, and to receive status information of the security system.

Figure 10:
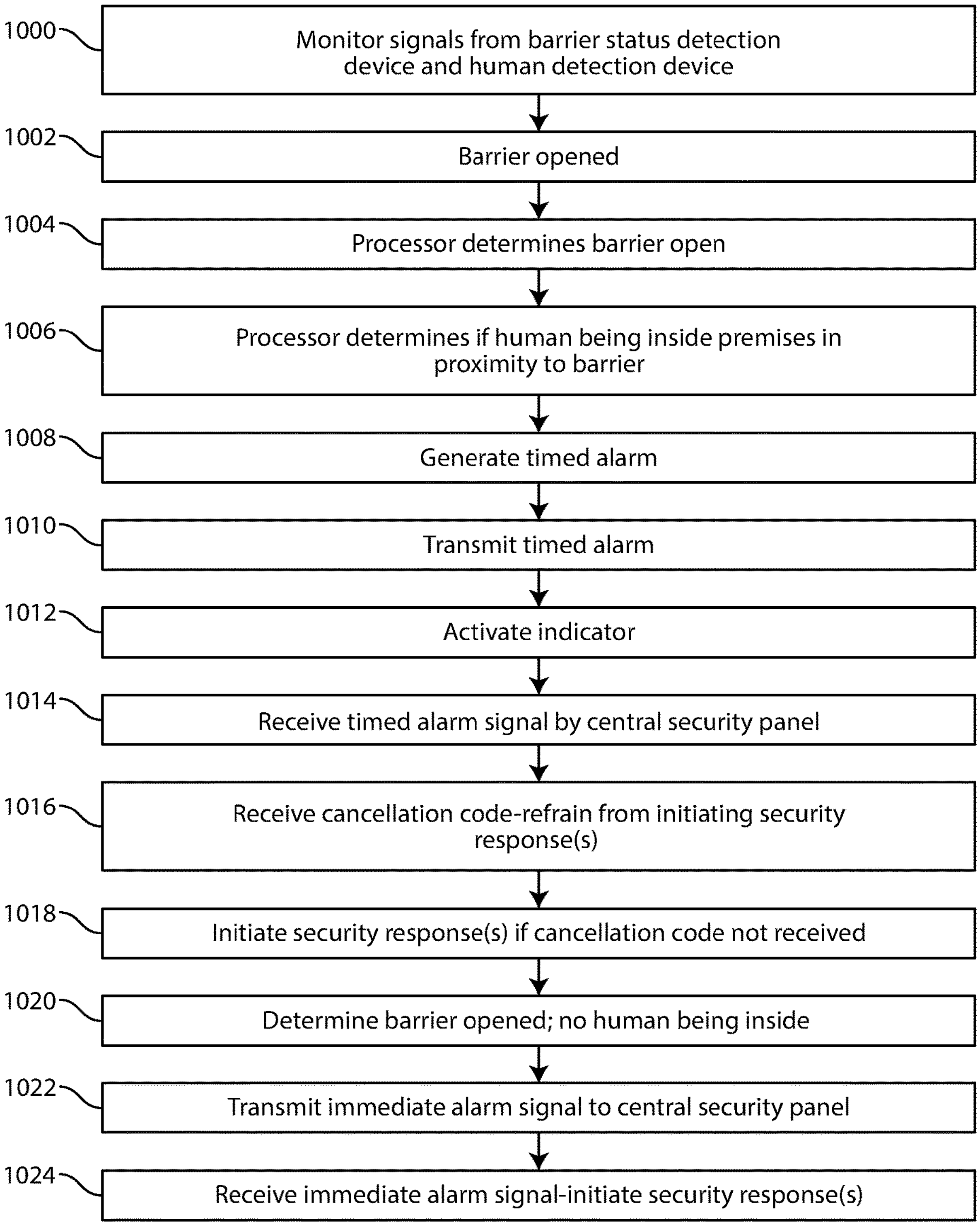
FIG. 10 is a flow diagram illustrating one embodiment of a method performed by the smart alarm device as shown in FIG. 6 and the central security panel as shown in FIG. 9, for reducing or preventing the occurrence of false alarms.

FIG. 10 is a flow diagram illustrating one embodiment of a method performed by barrier alarm device 600 installed proximate to a door or a window of a premises being monitored and central security panel 116, for reducing or preventing the occurrence of false alarms. It should be understood that in some embodiments, not all of the steps shown in FIG. 10 are performed. It should also be understood that the order in which the steps are carried out may be different in other embodiments.

At block 1000, processor 300 monitors signals from barrier status detection device 306 and human detection device 304 while the security system is in the "armed-home" mode. The armed-home mode is used when authorized persons are present in a home or business. In this mode, central security panel 116 causes one or more security responses to be generated in response to any door or window barrier alarm device sending an alarm signal, i.e., a signal in response to a door or window being opened. However, any signals from motion sensors are typically ignored.

At block 1002, the barrier (e.g., door or window) is opened by an individual inside the premises.

At block 1004, processor 300 determines that the barrier has been opened by detecting a change in a signal from barrier status detection device 306.

At block 1006, processor 300 determines whether a human being is inside the premises in proximity to the barrier by evaluating the signals from human detection device 304. In one embodiment, processor 300 determines whether a human hand is approaching, or has touched, a door handle, door deadbolt, a window latch or some other portion of a window.

In one embodiment, human detection device 304 periodically or continuously evaluates the space inside the premises and in proximity to the barrier to determine whether a human being is proximate to the barrier. For example, a motion sensor may be energized once every three seconds to determine whether any infrared signal are detected, indicating the presence of a human being. In another embodiment, an ultrasonic transducer may transmit an ultrasonic "ping" once every two seconds to determine whether a return signal is received, indicating the presence of a human being.

In another embodiment, human detection device 304 is kept in a default, "quiescent", de-energized or low-power state, and energized only when processor 300 determines that the barrier has been opened. The quiescent state refers to a low-power consumption state of operation or a no-power consumption state of operation, e.g., being in an "off" condition. In this way, power savings are achieved by the barrier alert device, as the circuitry comprising human detection device 304 is only energized when the barrier is opened. For example, in an embodiment where human detection device 304 comprises an ultrasonic transducer and an ultrasonic receiver, the ultrasonic transducer and ultrasonic receiver may be powered off until processor 300 determines that the barrier has been opened. In response to determining that the barrier has been opened, processor 300 energizes the ultrasonic transducer and an ultrasonic receiver circuitry and causes the ultrasonic transducer to emit a number of ultrasonic "pings" in order to determine whether a human being is in proximity to the barrier or not. In one embodiment, only a single ping is sent. Processor 300 then determines whether a human being is in proximity of the barrier by determining if a return signal was received by the ultrasonic receiver.

At block 1008, in response to determining that the barrier has been opened and that a human being is inside the premises in proximity to the barrier, processor 300 generates a timed alarm signal and provides it to transmitter 308. In another embodiment, the timed alarm signal is transmitted when processor 300 determines that the barrier has been opened and that a human being is not outside the premises in proximity to the barrier.

At block 1010, transmitter 308 transmits the timed alarm signal to a receiver, such as central security panel 116.

At block 1012, in response to transmitting the timed alarm signal or, alternatively, in response to processor 300 detecting that the barrier has been opened and that a person is inside (or not outside) a premises in proximity to the barrier, processor 300 causes indicator 204 to provide an audio or visual alert to a person that one or more security responses will be generated unless the timed alarm signal is canceled within a predetermined time period, such as 30 seconds. The alert may comprise a steady or blinking light, an audible alert, such as a series of "beeps", "chirps", a synthesized human voice providing instructions to cancel the alert, etc.

At block 1014, central security panel 116 receives the timed alarm signal from barrier alarm device 600 via receiver 906 and, in response, processor 900 begins tracking the time from when the timed alarm signal was received. In one embodiment, processor 900 may initiate a countdown timer, set to a predetermined time that provides enough time for a person to disarm central security panel 116 from anywhere within the premises when a door or window is inadvertently opened when central security panel 116 is armed. Central security panel 116 may be disarmed by a person entering a security code into security panel 116, or keypad 118.

At block 1016, if processor 900 receives a cancellation code from an authorized person to cancel the security response, processor 900 may cancel the countdown timer and refrain from enacting one or more security responses, such as contacting remote monitoring station 124, causing a siren inside the premises to sound a loud, audible warning, or contact one or more remote communication devices, such as wired or wireless phones, smart phones, tablets, wearables or computers.

At block 1018, if processor 900 does not receive the cancellation code from an authorized person to cancel the security response by the time the predetermined time has elapsed, or the countdown timer has expired, processor initiates the one or more security responses, as mentioned above.

At block 1020, when the security system is in the "armed-home" mode, in response to determining that a barrier has been opened and that a human being is not inside the premises in proximity to the barrier, processor 300 generates an immediate alarm signal and provides it to transmitter 308. In another embodiment, the immediate alarm signal is transmitted when processor 300 determines that the barrier has been opened and that a human being is outside the premises in proximity to the barrier.

At block 1022, transmitter 308 transmits the immediate alarm signal to central security panel 116.

At block 1024, central security panel 116 receives the immediate alarm signal via receiver 906 from barrier alarm device 600 and, in response, immediately initiates one or more security responses, as described above, i.e., within 5 seconds, or some other short time period on the order of seconds, of receipt of the immediate alarm signal.

Figure 11A:
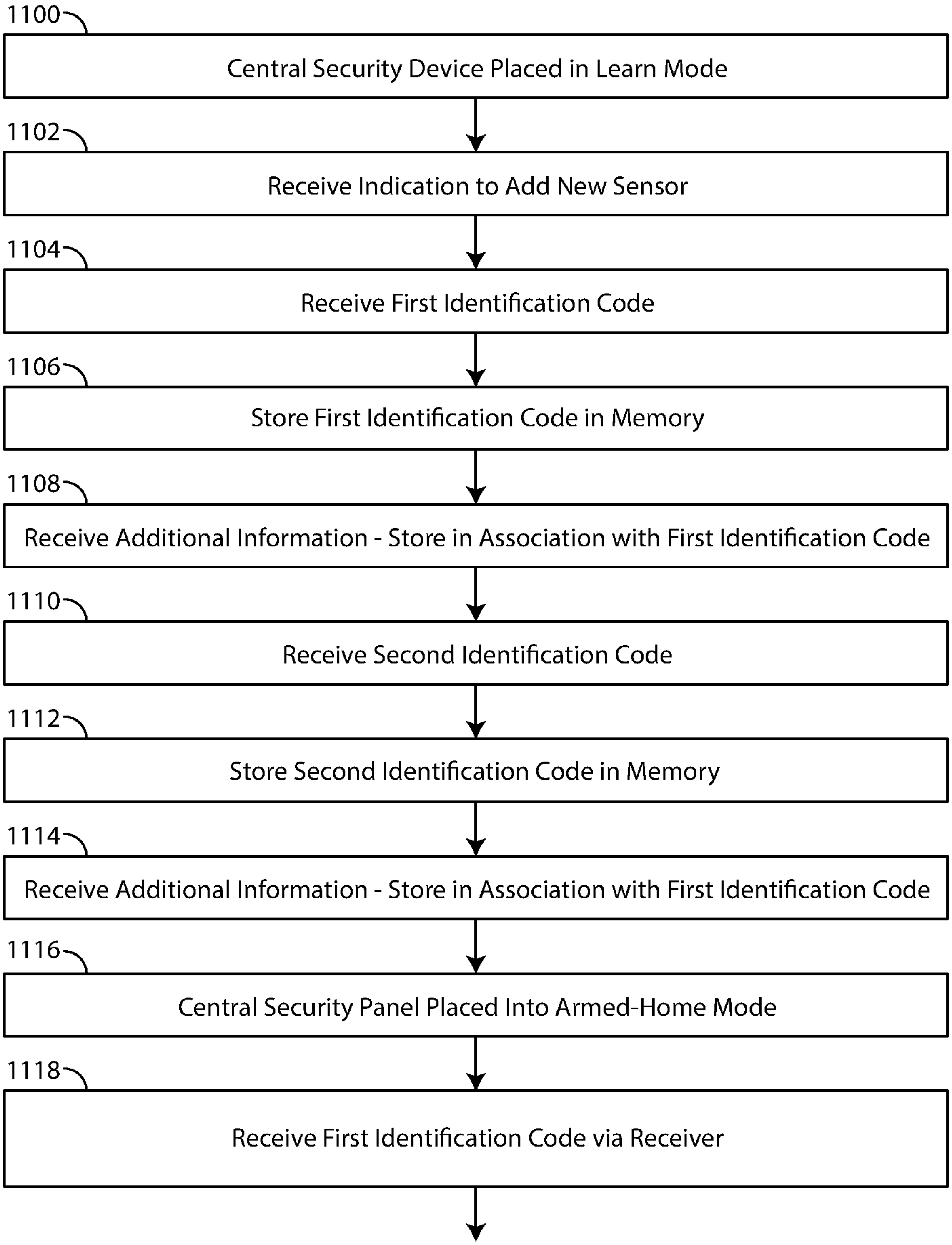
FIG. 11 is a flow diagram illustrating one embodiment of a method performed by barrier alarm device 600 installed proximate to a door or a window of a premises being monitored and central security panel 116, for reducing or preventing the occurrence of false alarms.
Figure 11B:
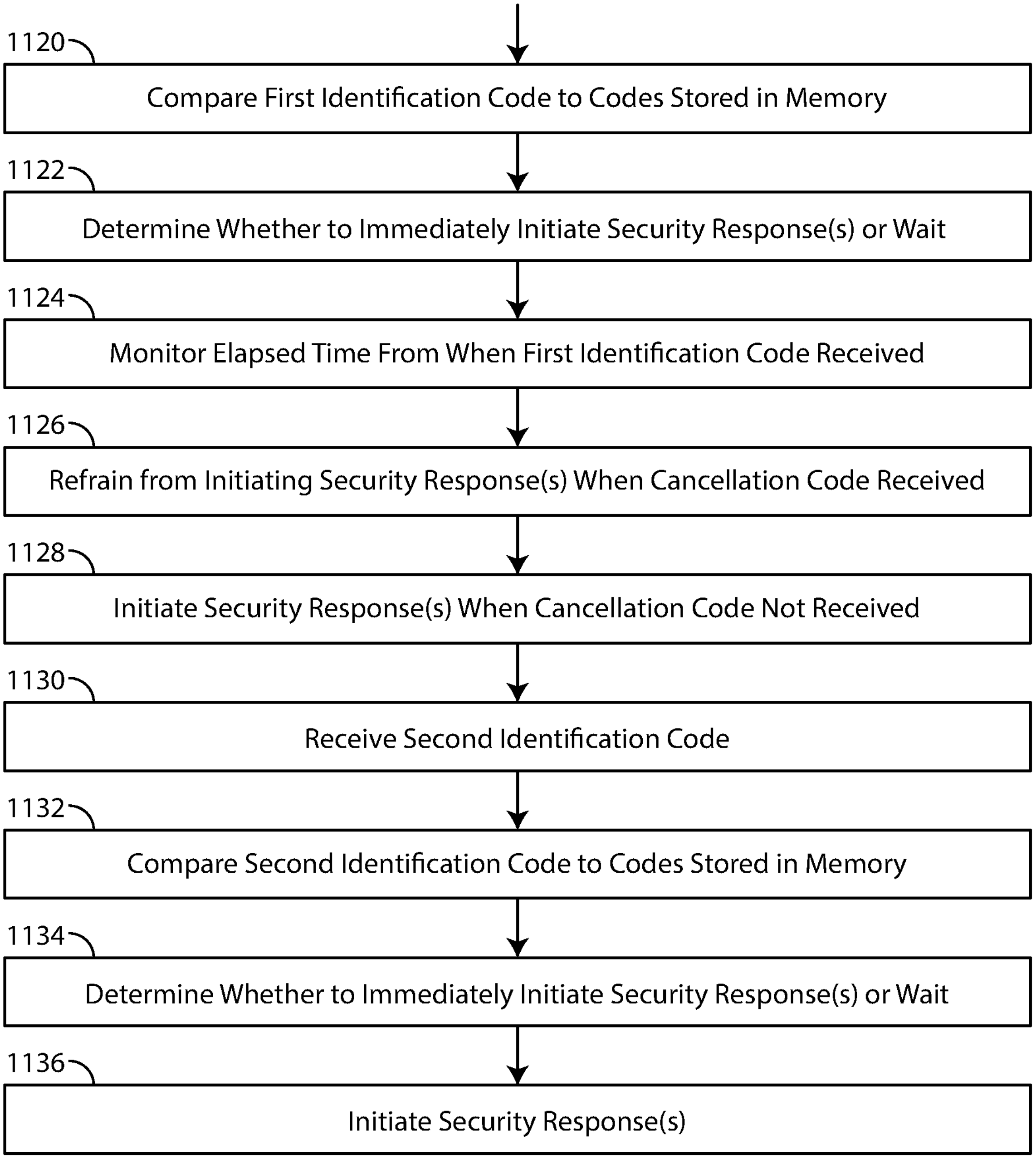

FIG. 11 is a flow diagram illustrating one embodiment of a method performed by barrier alarm device 600 installed proximate to a door or a window of a premises being monitored and central security panel 116, for reducing or preventing the occurrence of false alarms. It should be understood that in some embodiments, not all of the steps shown in FIG. 11 are performed. It should also be understood that the order in which the steps are carried out may be different in other embodiments.

As described previously, in this embodiment, barrier alarm device 600 is programmed to transmit both a timed alarm signal and an immediate alarm signal. The timed alarm signal may comprise a serial number of barrier alarm device 600, while the alarm signal may comprise a modified version of the serial number, in order to differentiate the two signal from each other by central security panel 116. Of course, the timed alarm signal the alarm signal could comprise other information, so long as central security panel 116 can differentiate between the two signals.

At block 1100, central security panel 116 is placed into a "learn" mode of operation, where new barrier alarm devices and/or other sensors may be introduced, or enrolled, into central security panel 116. In one embodiment, a user places central security panel 116 into the learn mode via user interface 908. In other embodiments, the user may place central security panel 116 into the learn mode via a personal communication device, such as a smart phone or tablet computing executing a software application specially designed to interface to central security panel 116.

At block 1102, the user provides an indication to central security panel 116 that the user would like to add a new sensor or barrier alarm device into central security panel 116. The indication is received by processor 900.

At block 1104, the user provides a first identification code to central security panel 116, indicative of barrier alarm device 600 when barrier alarm device transmits a timed alarm signal. The first identification code may comprise a serial number of smart barrier device 600, a serial number appended with an alphanumeric character (such as an "A"), some other alpha-numeric identification of smart barrier device 600 while transmitting a timed alarm signal.

The user may enter the first identification code via user interface 908 or by causing barrier alarm device 600 to transmit the timed alarm signal. In this embodiment, the user simulates a door or window opening by bringing a small magnet in proximity to barrier alarm device 600, in an embodiment where barrier alarm device 600 comprises a reed switch. In some embodiments, this must be repeated one or more times. While the user is bringing the magnet in proximity to barrier alarm device 600, the user ensures that human detection device 304 detects the user by pointing barrier alarm device 600 towards the user's body, or some other object such that human detection device 304 indicates the presence of a human. In response to detecting a human being, and that the magnet is brought in close proximity to barrier alarm device 600, barrier alarm device 600 transmits the first identification code.

Sensors may be assigned to zones based on their proximity to certain rooms, where triggering one sensor assigned to a zone causes the central security system 116 to report that a fault, or alarm, has occurred in that particular zone. However, zones may be set up to respond to signals from sensors differently. For example, signals received from sensors assigned to a first zone might cause central security panel 116 to immediately initiate one or more security responses, i.e., without allowing a person to cancel the alarm within a predetermined time period. Signals received from other sensors assigned to a second zone might cause central security panel 116 to begin a timer, allowing a person 30 seconds, for example, to cancel the alarm. Sensors assigned to such a zone might include entry doors, where authorized persons are given a fixed time period to disarm an alarm after entering a premises through a monitored door.

In other embodiments, each sensor is assigned to its own zone (effectively eliminating the concept of zones). In this embodiment, central security panel 116 is programmed to respond to each sensor in a particular way, i.e., either generating one or more immediate security responses, or allowing a predetermined time period for someone to cancel an alarm received from a sensor.

In one embodiment, barrier alarm device 600 is learned into two zones: a first zone whereby central security panel 116 immediately initiates one or more security responses, and a second zone, whereby central security panel 116 to allows a predetermined time for a person to cancel an alarm generated by an authorized person, i.e., a homeowner or other resident of a premises. This is accomplished by assigning two identification codes to barrier alarm device 600, one to initiate an immediate security response and another code to delay initiation of the security response. Such identification codes are stored in memory 302.

At block 1106, processor 900 receives the first identification code and stores it in memory 902.

At block 1108, the user may provide additional information to central security panel 116, indicating the type of sensor that was just added, such as a "door" or "window" sensor, a description of an intended location of the sensor (i.e., "back sliding door"), and an indication that one or more security responses should be delayed by a predetermined delay time when the timed alarm signal is received. The additional information is received by processor 900 and stored in memory 902 in association with the first identification code. When learning in a sensor to central security panel 116, i.e., activating a new sensor in a security system, each sensor is assigned to a zone by a person performing the learn process.

At block 1110, the user provides a second identification code to central security panel 116, indicative of barrier alarm device 600 when barrier alarm device transmits an immediate alarm signal. The second identification code may comprise a serial number of smart barrier device 600 with an alphanumeric character (such as a "B"), or some other alpha-numeric identification of smart barrier device 600 while transmitting an immediate alarm signal, different than the first identification code.

As with the first identification code, the user may enter the second identification code manually via user interface 908 or by causing barrier alarm device 600 to transmit the immediate alarm signal by bringing a small magnet in proximity to barrier alarm device 600 one or more times (or by some other method suited to the particular type of barrier alarm device). While the user is bringing the magnet in proximity to barrier alarm device 600, the user ensures that human detection device 304 does not detect the user by pointing barrier alarm device 600 towards empty space. In response to detecting that the magnet is brought in close proximity to barrier alarm device 600, and not detecting a human being, barrier alarm device 600 transmits the second identification code.

At block 1112, processor 900 receives the second identification code and stores it in memory 902. The second identification code may be associated with the first identification code, indicating that the two identification codes originate from the same barrier alarm device 600.

At block 1114, the user may provide additional information to central security panel 116, indicating the type of sensor that was just added, such as a "door" or "window" sensor, a description of an intended location of the sensor (i.e., "back sliding door"), and an indication that one or more security responses should be initiated immediately by processor 900 in response to receipt of the immediate alarm signal. Some of the additional information may be the same as the additional information associated with the first identification code, such as a sensor name, the type of sensor and/or its intended location, since the same barrier alarm device 600 transmits either the first identification code or the second identification code, depending on whether a human being is detected or not when a door or window is opened. The additional information is received by processor 900 and stored in memory 902 in association with the second identification code.

At block 1116, the user places central security panel 116 into an armed-home mode of operation, where central security panel 116 monitors smart barrier devices and other sensor in the security system.

At block 1118, central security panel 116 receives the first identification code associated with barrier alarm device 600 via receiver 906 when a person is inside a premises being monitored by barrier alarm device 600 and proximate to a door or window that is being monitored. The first identification code is provided to processor 900.

At block 1120, processor 900 compares the first identification code to a number of identification codes stored in memory 902.

At block 1122, when a match is found, processor 900 determines whether an immediate security response is needed, or whether a security response should be delayed by a predetermined delay time, in order to allow an authorized person to cancel any security response. Processor 900 evaluates the additional information stored in association with the matched identification code to make this determination, i.e., the first identification code is associated with a zone that immediately responds to immediate alarm signals or not. In this case, processor 900 determines that an immediate security response is not needed, based on the additional information.

At block 1124, processor 900 begins monitoring the time from when the first identification code was received, either by monitoring an elapsed time, or by starting a countdown timer set to the predetermined time period.

At block 1126, if processor 900 receives a cancellation code from an authorized person to cancel the security response, processor 900 stops monitoring the elapsed time from when the timed alarm signal is receives, or cancels the countdown timer, and refrains from enacting one or more security responses, such as contacting remote monitoring station 124, causing a siren inside the premises to sound a loud, audible warning, or contact one or more remote communication devices, such as wired or wireless phones, smart phones, tablets, wearables or computers.

At block 1128, if processor 900 does not receive a cancellation code from an authorized person to cancel the security response by the time the predetermined time has elapsed, or the countdown timer has expired, processor initiates the one or more security responses, as mentioned above.

At block 1130, at some other time, processor 900 receives a second identification code from barrier alarm device 600 while the security system is in the armed-home mode, generated by barrier alarm device 600 in response to barrier alarm device 600 determining that a barrier has been opened and that a human being is not inside the premises (or, alternatively, that a person is outside the premises) in proximity to the barrier.

At block 1132, processor 900 receives the second identification code from barrier alarm device 600 and compares the second identification code to the number of identification codes stored in memory 902.

At block 1134, when a match is found, processor 900 determines whether an immediate security response is needed, or whether a security response should be delayed by a predetermined delay time, in order to allow an authorized person to cancel any security response. Processor 900 evaluates the additional information stored in association with the matched identification code to make this determination, i.e., the first identification code is associated with a zone that immediately responds to immediate alarm signals or not. In this case, processor 900 determines that an immediate security response is needed, based on the additional information.

At block 1136, in response to determining that an immediate security response is needed, processor 900 immediately initiates one or more security responses, as described above.

Figure 12:
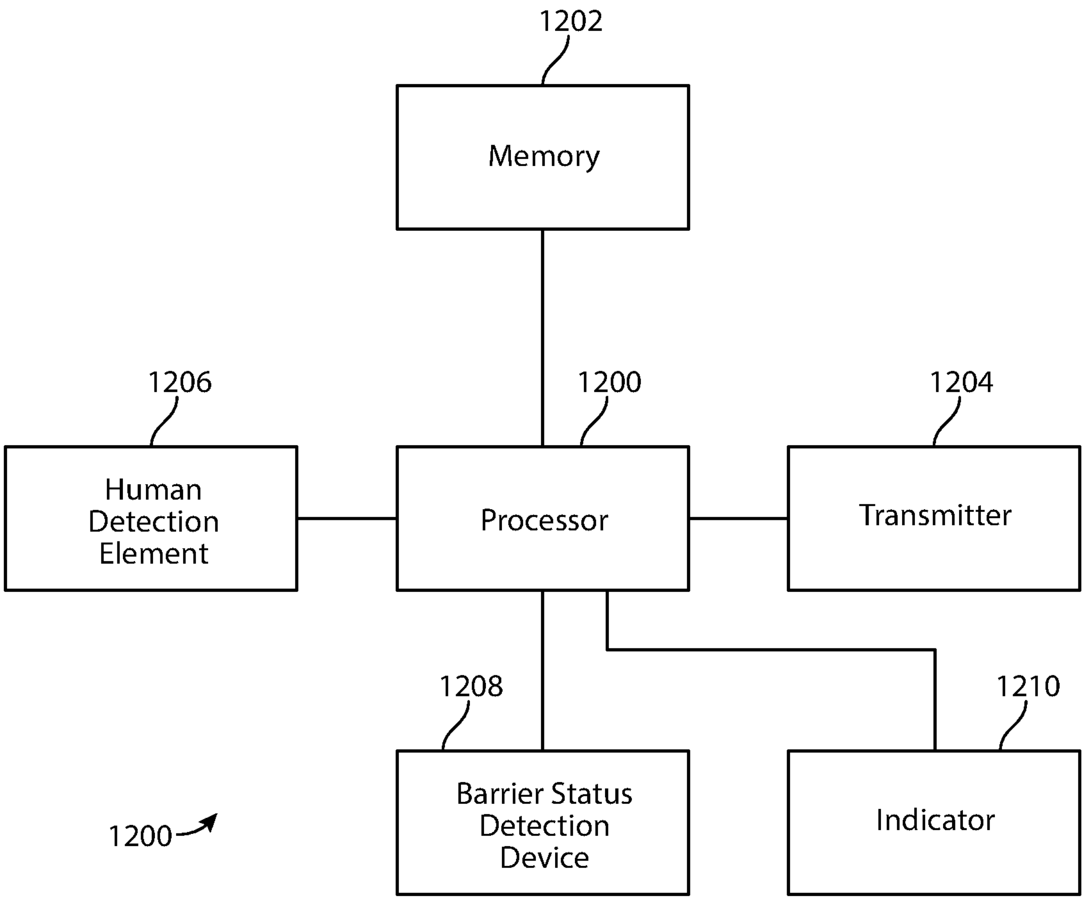
FIG. 12 is a functional block diagram of a stand-alone human detection device for use in yet another embodiment, where the human detection device is used in conjunction with an existing, prior-art barrier alarm device.

FIG. 12 is a functional block diagram of a stand-alone human detection device 1200, for use in yet another embodiment, where human detection device 1200 is used in conjunction with an existing barrier alarm device to reduce the occurrences of false alarms. In this embodiment, when a door or window is opened, a corresponding barrier alarm device transmits an alarm signal to central security panel 116, indicating that a door or a window has been opened. Human detection device 1200 also transmits a signal if a human being is in proximity to the door or window being monitored by the barrier alarm device. Central security panel 116 receives the alarm signal, and if no signal is received from human detection device 1200, central security panel 116 immediately initiates one or more security responses. If central security panel 116 does receive a signal from human detection device 1200 indicative of a human being inside the premises and in proximity to a door or window monitored by the barrier alarm device that transmitted the alarm signal, central security panel 116 initiates a timer, or monitors an elapsed time from when the signal is received from human detection device 1200, that allows an authorized person to cancel the one or more security responses if a cancellation code is received by central security panel 116 within a predetermined time period, such as 30 seconds. This embodiment allows implementation of a delayed security response while not having to replace an existing, prior art barrier alarm device.

Human detection device 1200 is generally no larger than a typical barrier alarm device, designed to be battery operated, and mounted in proximity to a door or window in order to detect when a human being is in proximity to the door or window. Human detection device 1200 may be mounted near a barrier alarm device, for example on a door next to a barrier alarm device, near a door handle, door lock, or a window latch to detect when a human hand is approaching, or has grabbed, a door handle, door lock, or a window latch.

Human detection device 1200 comprises processor 1201, memory 1202, transmitter 1204, human detection element 1206, in some embodiments, a barrier status detection device 1208, and an indicator 1210.

Processor 1201 is configured to provide general operation of human detection device 1200 by executing processor-executable instructions stored in memory 1202, for example, executable code. Processor 1201 typically comprises a general purpose processor, such as an ADuC7024 analog microcontroller manufactured by Analog Devices, Inc. of Norwood Mass., although any one of a variety of microprocessors, microcomputers, microcontrollers and/or custom ASICs may be used alternatively. Due to the relative small size of barrier alarm devices, and the fact that most barrier alarm devices are battery-powered, processor 1201 is typically selected to have low power consumption, small in size, and inexpensive to purchase.

Memory 1202 comprises one or more information storage devices, such as RAM memory, ROM memory, flash memory, SD memory, XD memory, or other type of electronic, optical, or mechanical memory device. Memory 1202 is used to store processor-executable instructions for operation of human detection device 1200 as well as any information used by processor 1201, such as threshold parameters, identification information, current or previous status information, etc. In some embodiments, memory 1202 may be part of processor 1201.

Transmitter 1204 comprises circuitry necessary to wirelessly transmit human status detection signals and/or status messages and/or other information to one or more receivers, such as central security panel 116. Such circuitry is well known in the art and may comprise BlueTooth, Low-Energy Bluetooth, Wi-Fi, RF, optical, ultrasonic circuitry, among others. Alternatively, or in addition, transmitter Human detection element 1206 comprises a device or circuitry to detect the presence of a person in proximity to the barrier alarm device, either inside a monitored premises, outside a monitored premises, or both. Examples of human detection element 1206 include an ultrasonic transducer/receiver, an infrared transmitter/receiver, a capacitance sensor, an RF tank circuit, an RFID receiver, a motion detector, a “time of flight” sensor, or some other circuitry or device able to detect the presence of a human being proximate to the barrier alarm device, door, or window.

In one embodiment, human detection element 1206 is chosen to only detect a person’s hand as it approaches or touches a door handle, door deadbolt, window latch or other designated portion of a window. In this embodiment, human detection element 1206 generally does not detect the mere presence of a person in proximity to a barrier. Thus, human detection element may be configured to only detect the presence of a human being with, say 3 inches of a door handle, door deadbolt, window latch, other designated portion of a window, or to human detection device 1200. For example, if human detection element 1206 comprises a time of flight sensor or an ultrasonic detector, human detection element 1206 may be selected based on a limited range of the time of flight sensor or ultrasonic detector. In other embodiments, memory 1202 may store a threshold distance, such as 3 inches, representing the maximum distance from a door handle, door deadbolt, window latch, other designated portion of a window, or to human detection device 1200 that human detection element 1206 will be triggered.

Optional barrier status detection device 1208 is coupled to processor 1201 and monitors or determines a state, physical condition, attribute, status, or parameter of something, such as the status (e.g., “open”, “closed”, “movement detected”, etc.) of a door, window, gate, or other entrance or exit barrier. Barrier status detection device 1208 may comprise a reed switch, ultrasonic transducer/receiver, an infrared transmitter/receiver, an RFID receiver, a tilt sensor, an accelerometer, a gyroscope, a motion sensor, or some other device to determine whether a window is open or closed. Barrier status detection device 1208 may be used with either the magnet associated with a typical barrier alarm device, such as a reed switch-based door or window sensor, or it could operate using a second magnet. In the case of “sharing” the barrier status alarm device’s magnet, human detection device 1200 may be installed just above or below the barrier status detection device, such that barrier status detection device 1208 can sense a magnetic field generated by the barrier alarm device’s magnet. In the case of using its own magnet, human detection device 1200 may be located away from a barrier alarm device. In the case of human detection element 1206 comprising a reed switch, human detection device 1200 operates much the same as a typical barrier alarm device, where processor 1201 detects when a door or window is opened based on the status of human detection element 1206, in this case, a reed switch.

Barrier status detection device 1208 may be used to keep the other components of human detection device 1200 in a default, "quiescent", low-power or de-energized state until barrier status detection device 1208 detects that a door or window being monitored by human detection device 1200 has been opened. In this embodiment, power savings may be maximized by keeping a majority of the circuitry in a low or de-powered state, and processor 1201, memory 1202, transmitter 1204 and human detection element 1206 may be selected to consume more energy than would otherwise be tolerated, since human detection device 1200 is typically battery-powered.

Indicator 1210 can comprise, for example, an LED or a piezo speaker and related electronics to indicate when a human being, or human hand, is in proximity to a door handle, door deadbolt, window latch (or some other portion of a window), or to human detection device 1200 itself. Indicator 1210 may be activated for a predetermined time period by processor 1201, for example 3 seconds, upon processor 1201 determining that a human being, or human hand, is in proximity to a door handle, door deadbolt, window latch (or some other portion of a window), or to human detection device 1200 itself. This serves to alert a person who is grabbing for a door handle, door deadbolt, window latch, or some other portion of a window, to know that human detection device 1200 has detected the person's hand. Alternatively, or in addition, processor 900 may cause activation of indicator 1210 to alert a person that a countdown time period has begun that allows an authorized person to cancel one or more security responses that will be initiated by central security panel 116 within the countdown time period.

Figure 13:
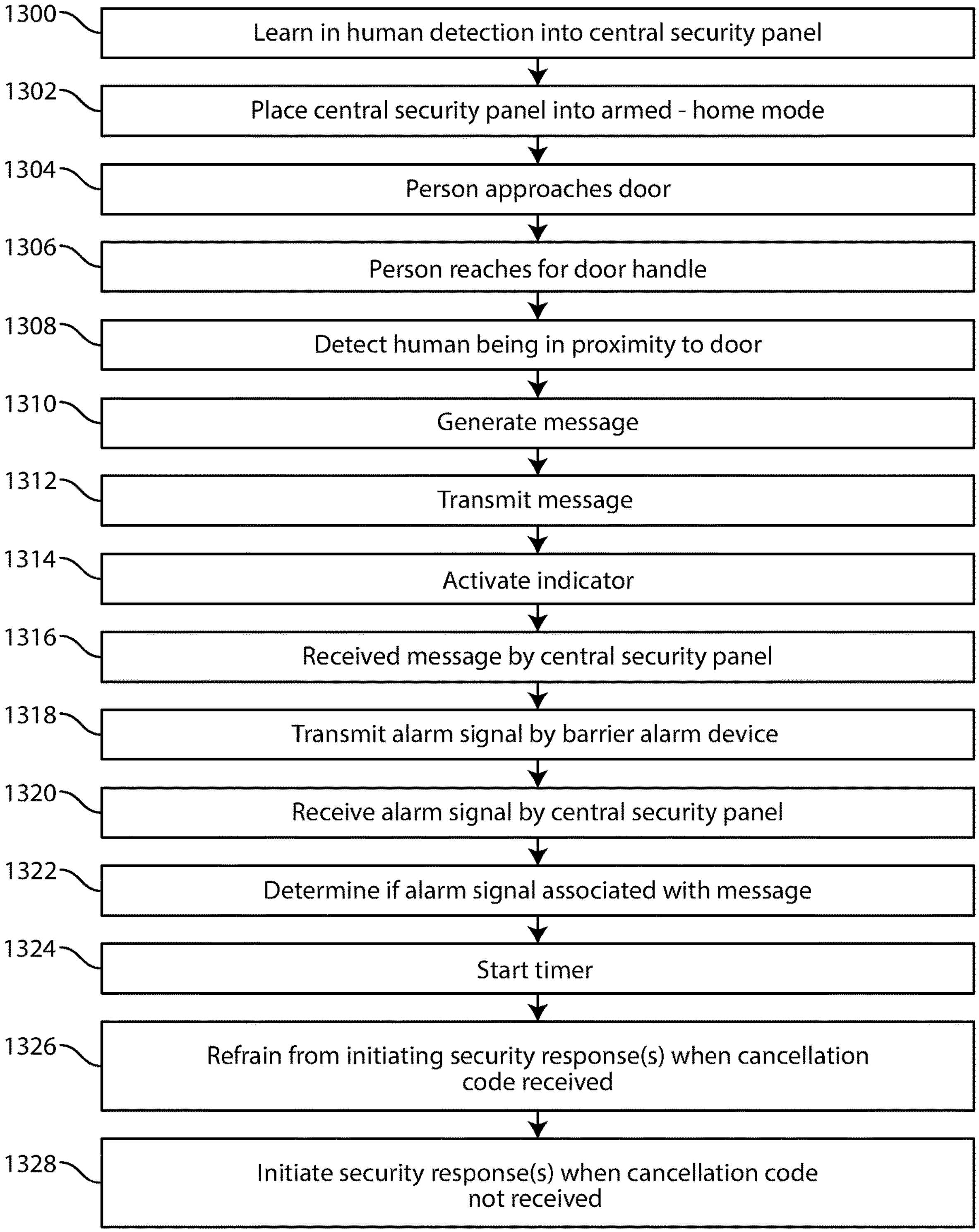
FIG. 13 is a flow diagram illustrating one embodiment of a method performed by the human detection device as shown in FIG. 12 and the central security panel as shown in FIG. 9 when the door is opened by someone from inside the premises when the central security panel is in an armed-home state.

FIG. 13 is a flow diagram illustrating one embodiment of a method performed by a human detection device 1200 and central security panel 116 when the door is opened by someone from inside the premises when central security panel 116 is in an armed-home state. It should be understood that in some embodiments, not all of the steps shown in FIG. 13 are performed and that the order in which the steps are carried out may be different in other embodiments.

At block 1300, human detection device 1200 is learned into central security panel 116, similar to learning in a barrier alarm device as described previously herein. As part of the learn in process, a user may associate human detection device 1200 with a particular prior-art barrier alarm device near where human detection device 1200 will be located for example, a user may name the human detection device 1200 with the same name as the barrier alarm device, i.e., "rear sliding door", or the user may assign human detection device 1200 to the same zone as the barrier alarm device.

At block 1302, central security panel 116 is in an armed-home mode of operation, human detection device 1200 is mounted to detect the presence of a human hand proximate to a door handle, door deadbolt, window latch, or some other part of a window, and a typical barrier alarm device monitors the same door or window that the human detection device 1200 is monitoring. For the remainder of the discussion of FIG. 13, it will be assumed that a door is being monitored.

In one embodiment, at block 1304, a person approaches the door inside a premises. Human detection device 1200 may not respond to the person who is merely in proximity of the person of the door in an embodiment where only a constricted area is monitored by human detection device 1200, such as the area around a door handle, door deadbolt, window latch, or other portion of a window.

At block 1306, the person reaches for a door handle to open the door.

At block 1308, human detection device 1200 detects the person's hand approaching the door handle, as human detection element 1206 provides a signal to processor 1201, indicating detection of the human hand (or detection of a human body proximate to the door).

At block 1310, processor 1201 receives the signal from human detection element 1206 and, in response, generates a message for transmission by transmitter 1204 to central security panel 116. The message typically comprises an identification code to uniquely identify human detection device 1200.

At block 1312, transmitter 1204 transmits the message.

At block 1314, processor 1201 may cause indicator 1210 to activate, alerting the person that human detection device 1200 has sensed the person, or the person's hand, in proximity to the door handle.

At block 1316, central security panel 116 receives the message from human detection device 1200 and provides it to processor 900. Processor 900 may begin monitoring the elapsed time from when the message was received.

A short time after detecting that the human hand is in proximity to the door handle, the person grabs the door handle and opens the door. In one embodiment, this is when human detection device 1200 transmits the signal to central security panel 116, as opposed to transmitting the signal when the human hand is near the door handle.

At block 1318, the prior-art barrier alarm device transmits an alarm signal to central security panel 116, indicating that the door has been opened. The alarm signal typically comprises an identification code that uniquely identifies the prior-art barrier alarm device.

At block 1320, central security panel 116 receives the alarm signal and provides it to processor 900. Processor 900 may determine the time when the alarm signal was received.

At block 1322, processor 900 may determine that the alarm signal is associated with the message by determining that an identification code of the alarm signal is associated with the identification code of the message, i.e., that each identification code is associated with the same location (i.e., "rear sliding door"), or that each identification code is associated with the same zone. If the two identification codes are not associated with the same location, processor 900 may immediately cause one or more security responses to be generated. If the two identification codes are associated with the same location, this indicates that the message that was transmitted by the human detection device is monitoring the same door or window as a barrier alarm that is monitoring the same door or window.

At block 1324, in one embodiment, if the time between when the message is received and the alarm signal is received is less than a predetermined time period, such as 3 seconds, processor 1201 begins monitoring the time from when either the message from human detection device 1200 was received, or from when the alarm signal from the barrier alarm device was received. In one embodiment, processor 1201 starts a countdown timer, set for a predetermined time period for a person inside the premises to cancel a security response. The predetermined time is selected to allow the some time between when a human hand is detected near the door handle and the time when the door is actually opened.

At block 1326, if processor 900 receives a cancellation code from an authorized person to cancel the security response, processor 900 stops monitoring the elapsed time, or cancels the countdown timer, and refrains from enacting one or more security responses, such as contacting remote monitoring station 124, causing a siren inside the premises to sound a loud, audible warning, or contact one or more remote communication devices, such as wired or wireless phones, smart phones, tablets, wearables or computers.

At block 1328, if processor 900 does not receive a cancellation code from an authorized person to cancel the security response by the time the predetermined time has elapsed, or the countdown timer has expired, processor 900 initiates the one or more security responses, as mentioned above.

At block 1330, referring back to block 1318, if the alarm signal is not received within the predetermined time from when the message was received from human detection device 1200, processor 900 immediately initiates one or more security responses.

Figure 14:
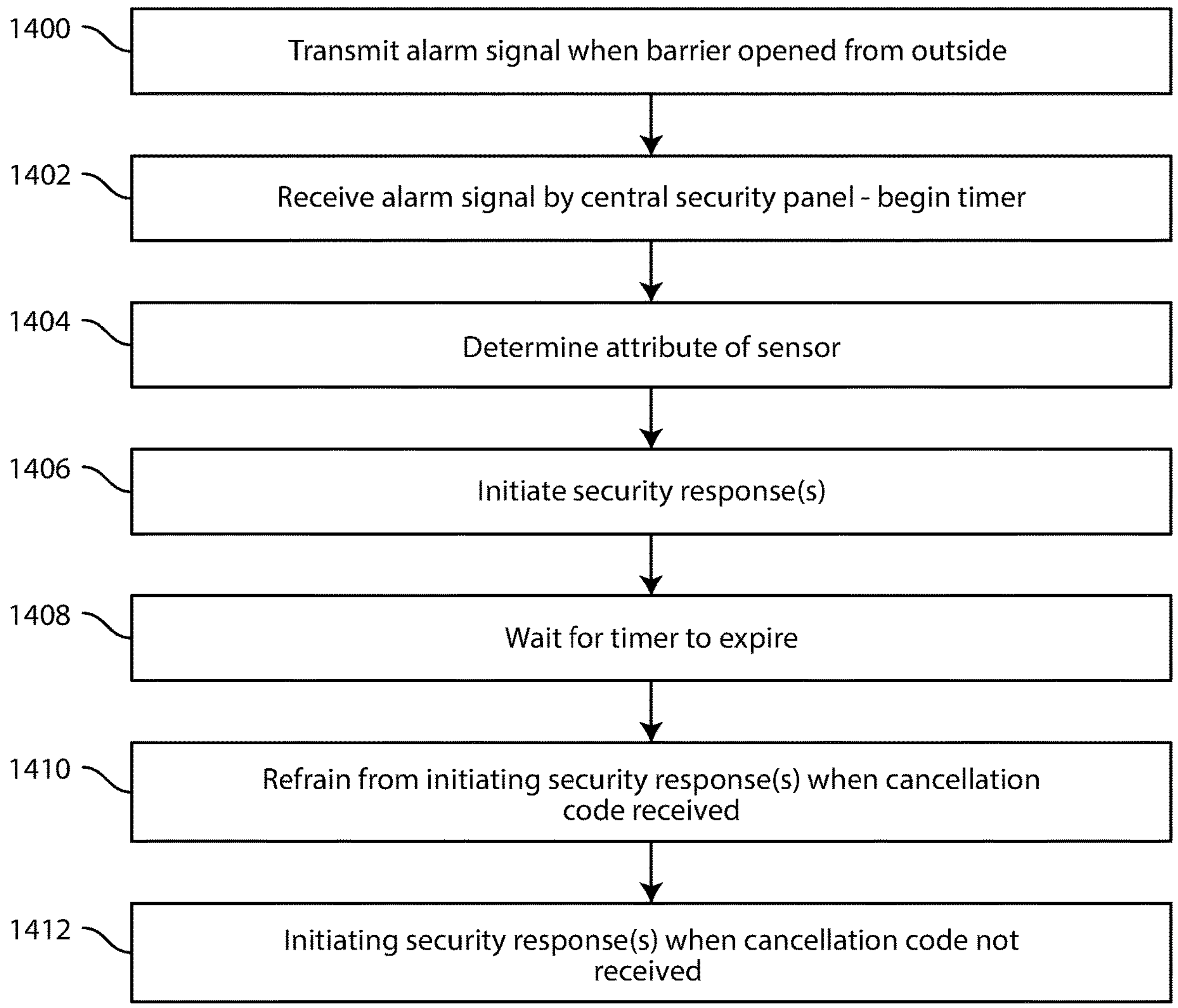
FIG. 14 is a flow diagram illustrating the embodiment of a method performed by the human detection device and the central security panel, as described by FIG. 13, except that a door is opened by someone from outside a premises when the central security panel is in an armed-home state.

FIG. 14 is a flow diagram illustrating the embodiment of a method performed by stand-alone human detection device 1200, a prior art barrier alarm device 104 or 102 and central security panel 116, as described by FIG. 13, except that in this description, the door is opened by someone from outside the premises when central security panel is in an armed-home state. It should be understood that in some embodiments, not all of the steps shown in FIG. 14 are performed and that the order in which the steps are carried out may be different in other embodiments.

At block 1400, the barrier alarm device 102/104 transmits an alarm signal when it detects that the door has been opened. Since the door was opened by someone outside the premises, human detection device 1200 does not transmit a message to central security panel 116.

At block 1402, central security panel 116 receives the alarm signal via receiver 906, and provides it to processor 900. Processor 900 may being monitoring the elapsed time from when the alarm signal was received.

At block 1404, processor 900 may determine a type of sensor that sent the alarm signal, a zone to which the sensor belongs, or otherwise determine whether one or more security responses should be initiated, based on an identification code contained within the alarm signal;

At block 1406, if the identification code is indicative of immediately initiating one or more security responses, processor 900 initiates the one or more security responses.

At block 1408, if the identification code is indicative of delaying implementation of the one or more security responses, processor 900 waits for the elapsed time to expire in accordance with a predetermined time to allow a person to cancel the one or more security responses.

At block 1410, if processor 900 receives a cancellation code from an authorized person to cancel the one or more security responses, processor 900 stops monitoring the elapsed time, or cancels the countdown timer, and refrains from enacting one or more security responses, such as contacting remote monitoring station 124, causing a siren inside the premises to sound a loud, audible warning, or contact one or more remote communication devices, such as wired or wireless phones, smart phones, tablets, wearables or computers.

At block 1412, if processor 900 does not receive a cancellation code from an authorized person to cancel the one or more security responses by the time the predetermined time has elapsed, or the countdown timer has expired, processor 900 initiates the one or more security responses.

Figure 15:
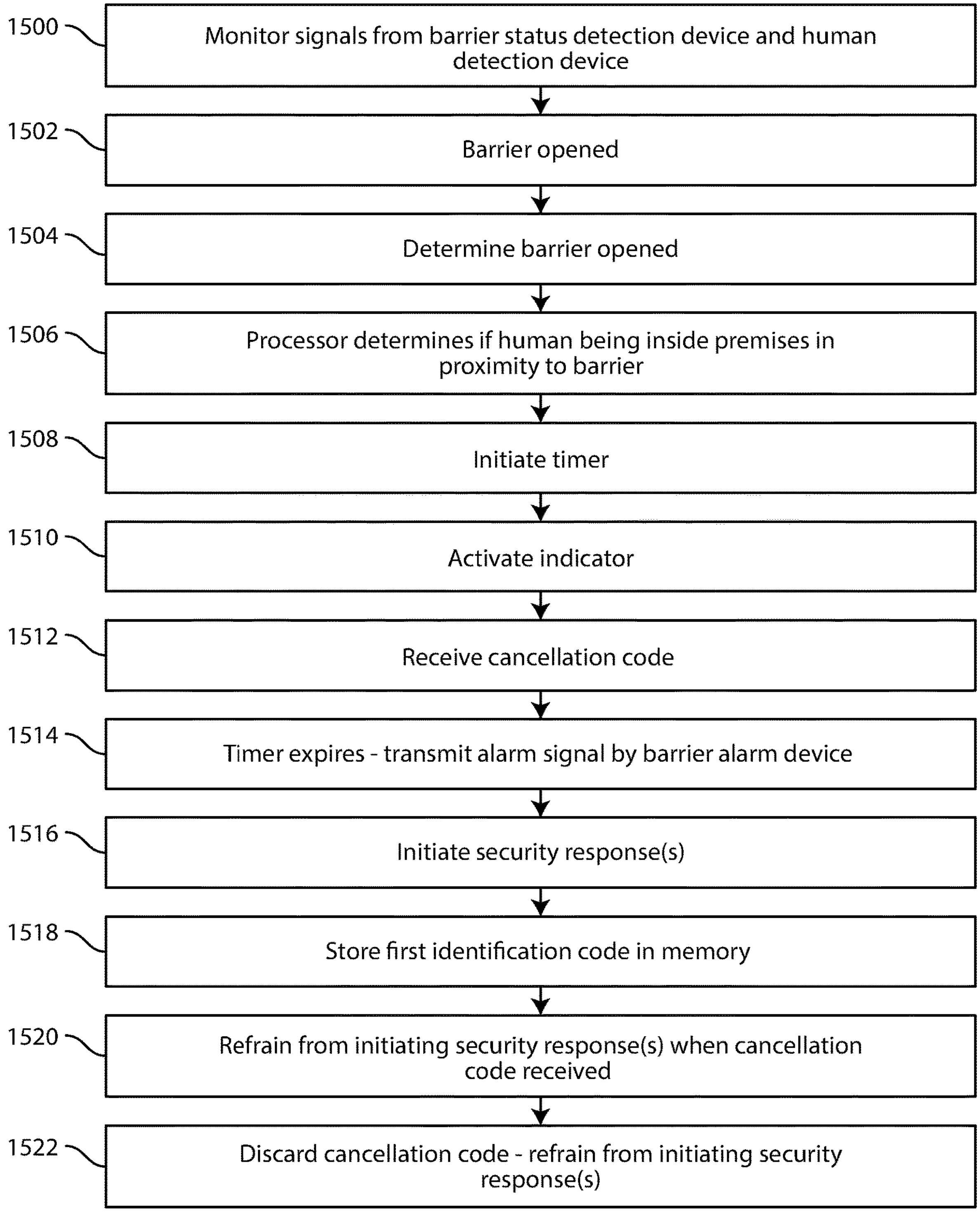
FIG. 15 is a flow diagram illustrating another embodiment of a method, performed by the barrier alarm device of FIG. 6, to reduce the occurrence of false alarms, where the barrier alarm device initiates a countdown timer before sending an immediate alarm signal the central security device as shown in FIG. 9.

FIG. 15 is a flow diagram illustrating another embodiment of a method performed by barrier alarm device 600 to reduce the occurrence of false alarms, where barrier alarm device 600 initiates a countdown timer before sending an immediate alarm signal to central security device 116. It should be understood that in some embodiments, not all of the steps shown in FIG. 15 are performed and that the order in which the steps are carried out may be different in other embodiments.

At block 1500, processor 300 monitors signals from barrier status detection device 306 and human detection device 304 while the security system is in the "armed-home" mode.

At block 1502, the barrier (e.g., door or window) is opened by an individual inside the premises.

At block 1504, processor 300 determines that the barrier has been opened by detecting a change in a signal from barrier status detection device 306.

At block 1506, processor 300 determines whether a human being is inside the premises in proximity to the barrier by evaluating the signals from human detection device 304.

In one embodiment, human detection device 304 periodically or continuously evaluates the space inside the premises and in proximity to the barrier to determine whether a human being is proximate to the barrier.

In another embodiment, human detection device 304 is kept in a default, "quiescent", de-energized or low-power state, and energized only when processor 300 determines that the barrier has been opened, as described previously.

At block 1508, in response to determining that the barrier has been opened and that a human being is inside the premises in proximity to the barrier, processor 300 begins monitoring the time from when the door or window was opened, or begins a countdown timer set to a predetermined time period, such as 30 seconds, for an authorized person to cancel the one or more security responses.

At block 1510, processor 300 causes indicator 204 to provide an audio or visual alert to a person, indicating that one or more security responses will be initiated by central security panel 116 unless an authorized person cancels the one or more security responses within the predetermined time period. Processor 300 may cause indicator 204 to modify the audio or visual alert as the predetermined time period elapses, such as blinking at a slow rate to blinking at a faster rate, chirping at a slow rate to chirping at a faster rate, in order to impart an importance to an authorized person that the predetermined time period is close to expiration.

At block 1512, before the predetermined time period expires, processor 900 in central security panel 116 may receive a cancellation code from an authorized person to cancel the one or more security responses, either via user interface 908, or via receiver 906, as a result of triggering the countdown time in barrier alarm device 600. Processor 900 compares the cancellation code to one or more cancellation codes stored in memory 902 and, if a match is found, processor 900 waits for an immediate alarm signal to be received from barrier alarm device 600, up to the predetermined time used as the countdown time at barrier alarm device 600.

At block 1514, when processor 300 determines that the predetermined time period has expired in barrier alarm device 600, processor 300 transmits an immediate alarm signal to central security panel 116, the immediate alarm signal comprising an identification code of barrier alarm device 600.

At block 1516, central security panel 116 receives the immediate alarm signal and provides it to processor 900.

At block 1518, if processor 900 has not received the cancellation code before receiving the immediate alarm signal, processor 900 immediately initiates the one or more security responses, i.e., within 5 seconds or some other short time period on the order of seconds.

At block 1520, if processor 900 has received a valid cancellation code before receiving the immediate alarm signal, processor 900 simply ignores the immediate alarm signal and refrains from initiating the one or more security responses.

At block 1522, if processor 900 fails to receive an immediate alarm signal from barrier alarm device 600, processor 900 simply discards the authorized cancellation code and resets its timer.

Figure 16:
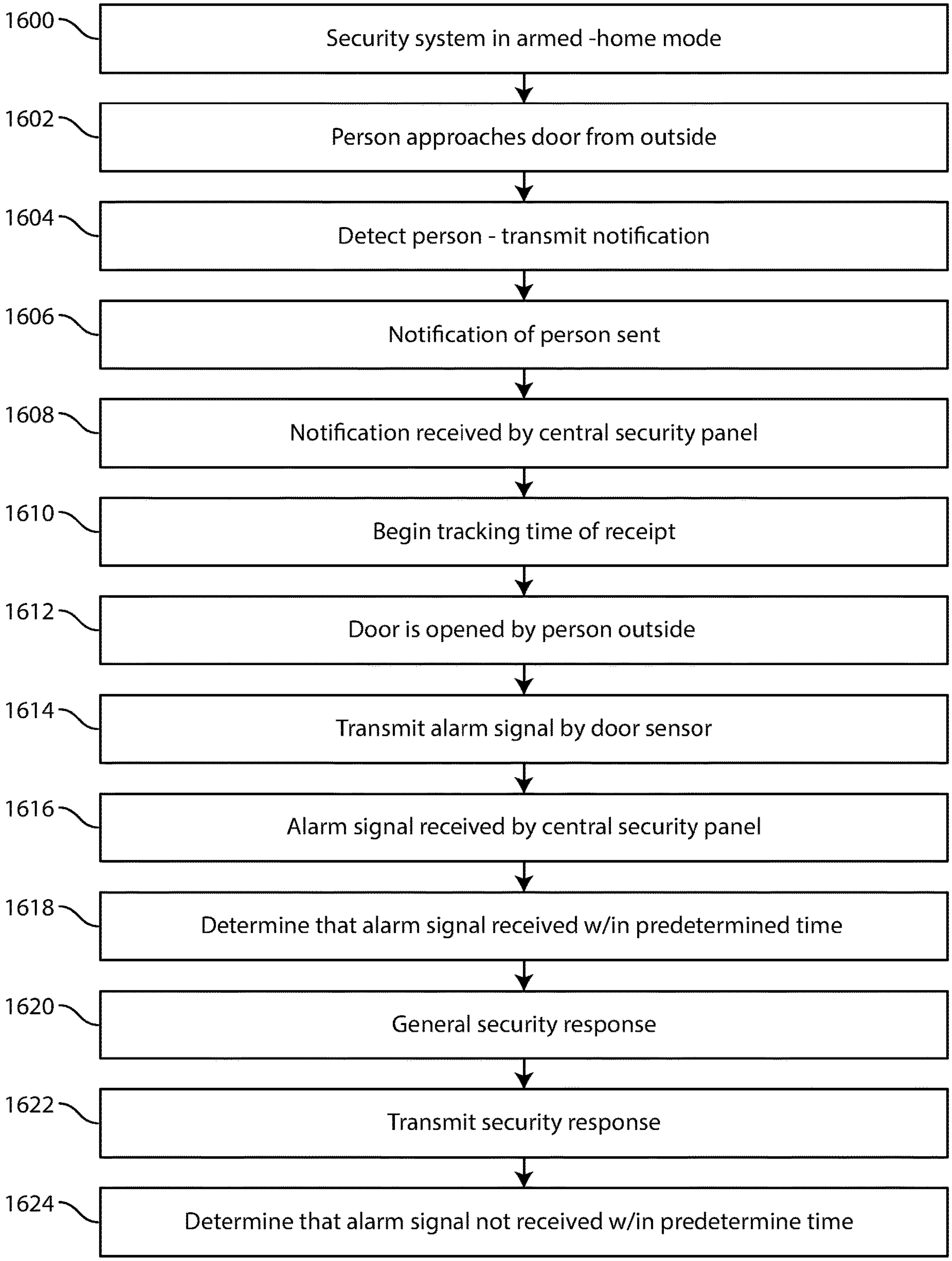
FIG. 16 is a flow diagram illustrating one embodiment of a method performed by the central security panel of FIG. 9 or a server as shown in FIG. 4 for reducing the occurrences of false alarms when the door is opened by someone from outside of a premises when a home security system is in an armed-home state.

FIG. 16 is a flow diagram illustrating one embodiment of a method performed by central security panel 116 or server 400 for reducing the occurrences of false alarms when the door is opened by someone from outside the premises when central security panel 116 is in an armed-home state. Throughout this section, reference will be made only to central security panel 116 and its components therein, although it is to be understood that reference will also apply to server 400 and similar components. In this embodiment, central security panel 116 receives alarm signals from a prior-art barrier alarm device, such as window sensor 102 or door sensor 104, and also receives a human status signals from a camera 128 that is configured to view an area outside area proximate to door 112. Camera 128 could comprise a wireless still or video camera wireless coupled to local-area network 126 (or to gateway 402), comprising one or more well-known wireless gateways, routers, modems, repeaters, etc., such as home Wi-Fi network equipment. In one embodiment, camera 128 may comprise motion detection capability, and send one or more digital photos or videos when movement is detected in front of door 112. In some embodiments, camera 128 may be part of a doorbell camera 130 or "doorbell cam", such as a Wi-Fi enabled doorbell camera sold by Ring, Inc. of Santa Monica, Calif. Such doorbell cams may begin to record images when a doorbell button 132 is pressed, or when doorbell camera 130 detects motion in front of door 112. In any case, when a person is detected, a notification may be transmitted by camera 128 or doorbell camera 130 to local-area network 126/gateway 402, and local-area network 126/gateway 402 forwards the alert to a user's smart device, computer, wearable, etc. via wide-area network 122/404. The notification may comprise the digital photo(s) and/or video. In this embodiment, central security panel 116 is configured to receive the notification from camera 128 or doorbell camera 130 when camera 128/doorbell camera 130 detects a person outside of door 112. In some embodiments, the notification is additionally received by chime 134, located inside a premises monitored by prior-art door sensor 104, which may be used to emit a gentle sound, or "chime", to alert people inside the premises that there is someone outside of door 112. In this embodiment, user interface 908 may additionally comprise a microphone that can detect sound emissions from chime 134 to provide a notification to central security panel 116 that a person is outside and in proximity to door 112. It should be understood that in some embodiments, not all of the steps shown in FIG. 16 are performed and that the order in which the steps are carried out may be different in other embodiments.

At block 1600, door 112 is monitored by prior-art door sensor 104 and an area outside of door 112, proximate to door 112, is monitored by camera 128/doorbell camera 130. Prior-art door sensor 104 is in communication with central security panel 116, and camera 128/130 is in communication with local-area network 126. In another embodiment, camera 128/130 is in communication directly with central security system 116 by "learning in" camera 128/130 to central security system similarly to how a sensor may be learned in. Central security system 116 is placed into an armed-home mode.

At block 1602, a person approaches door 112 from the outside.

At block 1604, camera 128/130 detects the person and, in response, transmits a notification to local-area network 126.

At block 1606, local-area network 126 forwards the notification to wide-area network 122/404 for alerting a user that a person is outside of door 112, as well as to central security panel 116. The notification may be forwarded to a back-end system that manages user accounts associated with cameras 128/130, where the notification may be forwarded to a user's mobile device, such as a phone, tablet, or wearable device in accordance with a phone number, email address, or some other notification code provided by a user to receive such notifications from the back end system. In one embodiment, a user account may store a notification code identifying central security panel 116 so that when a notification is received from camera 128/130 by the back end system, central security panel 116 is provided with the notification via wide-area network 122/404.

At block 1608, the notification is also received by central security panel 116, either directly from camera 128/130, from local-area network 126 or from the back end system via wide-area network 122/404.

At block 1610, processor 900 receives the notification and, in response, begins tracking the time from when the notification was received.

At block 1612, the person outside door 112 opens door 112.

At block 1614, in response to detecting that door 112 has been opened, prior-art door sensor 104 transmits an alarm signal to central security panel 116.

At block 1616, central security panel 116 receives the alarm signal and provides it to processor 900.

At block 1618, processor 900 determines that the alarm signal was received within a predetermined time from when processor 900 received the notification. The predetermined time is chosen to allow the person outside door 112 to open door 112, in some cases, by forcing door 112 open. As such, the predetermined time may be chosen to be several minutes, such as 2 minutes.

At block 1620, processor 900 generates a security response in response to determining that the alarm signal was received within the predetermined time from when processor 900 received the notification.

At block 1622, processor 900 provides the security response to transmitter 904, which transmits the security response to remote monitoring station 124, to a local siren, and/or to a local illumination device, such as one or more lights, strobes, etc.

At block 1624, after block 1614, processor 900 determines that the alarm signal was not received within the predetermined time from when processor 900 received the notification from camera 128/130. In this case, processor 900 ignores the alarm signal and does not generate a security response, as receipt of the alarm signal outside the predetermined time period indicates that door 112 was opened by an authorized person inside door 112.

The methods or algorithms described in connection with the embodiments disclosed herein may be embodied directly in hardware or embodied in processor-readable instructions executed by a processor. The processor-readable instructions may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components.

Accordingly, an embodiment of the invention may comprise a computer-readable media embodying code or processor-readable instructions to implement the teachings, methods, processes, algorithms, steps and/or functions disclosed herein.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

I claim:

1. A barrier alarm device, comprising:

a barrier status detection device for indicating that a barrier monitored by the barrier alarm device has been opened;

a human detection device for indicating that a human being is inside a premises in proximity to the barrier;

a transmitter for transmitting a timed alarm signal to a receiver associated with a security panel, the timed alarm signal for initiating a timer associated with the security panel;

a memory having processor-executable instructions stored thereon; and a processor coupled to the barrier status detection device, the human detection device, the transmitter, and the memory, for executing the processor-executable instructions that cause the barrier alarm device to:

respond to the barrier status detection device indicating that the barrier has been opened by determining whether the human detection device indicates that the human being is inside the premises in proximity to the barrier; and transmit, via the transmitter, the timed alarm signal to the receiver only when it is determined that the human detection device indicates that the human being is inside the premises in proximity to the barrier.

2. The barrier alarm of claim 1, wherein the processor-executable instructions further comprise instructions that cause the barrier alarm device to transmit, via the transmitter, an immediate alarm signal to the receiver for causing a security response to be initiated when it is determined that the human detection device does not indicate that the human being is inside the premises in proximity to the barrier.

3. The barrier alarm of claim 1 further comprising an indicator, coupled to the processor, for providing an alert to the human when the timed alarm signal is caused to be transmitted.

4. The barrier alarm of claim 3, wherein the indicator comprises a light-emitter and the alert comprises a blinking light produced by the light-emitter.

5. The barrier alarm of claim 3, wherein the indicator comprises a speaker, and the alert comprises a sound produced by the speaker.

6. A central security panel, comprising:

a communication interface for receiving signals from a barrier alarm device;

a memory for storing processor-executable instructions; and a processor coupled to the communication interface and the memory, for processing the processor-executable instructions that causes the central security panel to:

receive a first alarm signal from a barrier alarm device that monitors a barrier of a premises, the first alarm signal indicative of the barrier being opened;

respond to the first alarm signal by determining whether a human being has been indicated to be inside the premises and in proximity to the barrier;

begin a measuring of an elapsed time from when the first alarm signal was received when it is determined that the human being has been indicated to be inside the premises in proximity to the barrier;

determine whether the elapsed time has exceeded a predetermined time;

generate a security response when it is determined that the elapsed time has exceeded the predetermined time; and provide the generated security response to a receiver via the communication interface.

7. The central security panel of claim 6, wherein the processor-executable instructions further comprise instructions that cause the barrier alarm device to generate the security response when it is determined that the human being has not been indicated to be inside the premises in proximity to the barrier and to provide the generated security response to the receiver via the communication interface.

8. The central security panel of claim 6, further comprising:

an indicator coupled to the processor for providing an alert to the human being when the first alarm signal is received; and a user interface coupled to the processor for receiving user input for stopping the measuring of the elapsed time and for turning off the alert.

9. The central security panel of claim 8, wherein the indicator comprises a light-emitter, and the alert comprises a blinking light produced by the light-emitter.

10. The central security panel of claim 8, wherein the indicator comprises a speaker, and the alert comprises a sound produced by the speaker.

11. A method, comprising:

in response to a barrier status detection device associated with a barrier alarm device indicating that a barrier being monitored by the barrier alarm device has been opened, determining whether a human detection device associated with the barrier alarm device indicates that a human being is inside a premises monitored by a central security panel in proximity to the barrier; and transmitting by the barrier alarm device a timed alarm signal to the central security panel for the purpose of initiating a timer associated with the central security panel only when it is determined that the human detection device indicates that the human being is in inside the premises and in proximity to the barrier.

12. The method of claim 11, further comprising transmitting by the barrier alarm device an immediate alarm signal to the central security panel for causing a security response to be initiated when it is determined that the human detection device does not indicate that the human being is in inside the premises and in proximity to the barrier.

13. The method of claim 11 further comprising: generating by at least one of the barrier alarm device and the securing panel an alert when the timed alarm signal is transmitted, the alert indicating that a security response will be initiated after a predetermined time unless the human being performs an act to cancel the security response.

14. The method of claim 13, wherein the alert comprises a blinking light.

15. The method of claim 13, wherein the alert comprises a sound.

16. A method performed by a central security panel, comprising:

receiving a first alarm signal from a barrier alarm device that monitors a barrier of a premises, the first alarm signal indicative of the barrier being opened;

responding to the first alarm signal by determining whether a human being has been indicated to be inside the premises in proximity to the barrier;

starting a countdown timer when it is determined that the human being has been indicated to be inside the premises in proximity to the barrier;

determining whether the countdown timer has expired;

in response to determining that the countdown timer has expired, generating a security response; and providing the generated security response to a receiver via a communication interface.

17. The method of claim 16, further comprising generating the security response when it is determined that the human being has not been indicated to be inside the premises in proximity to the barrier and providing the generated security response to the receiver via the communication interface.

18. The method of claim 16, further comprising: generating an alert when the first alarm signal is received; receiving a cancellation signal prior to the countdown timer elapsing; and refraining from providing the security response to the receiver and stopping the generation of the alert when the cancellation signal is received prior to the countdown timer elapsing.

* * * * *